(12) United States Patent
Afzulpurkar et al.

(10) Patent No.: US 7,949,157 B2
(45) Date of Patent: May 24, 2011

(54) INTERPRETING SIGN LANGUAGE GESTURES

(76) Inventors: Nitin Afzulpurkar, Bangkok (TH); Trinh Huu Phuc, Can Tho (VN)

( * ) Notice: Subject to any disclaimer, the term of this patent is extended or adjusted under 35 U.S.C. 154(b) by 956 days.

(21) Appl. No.: 11/837,283

(22) Filed: Aug. 10, 2007

(65) Prior Publication Data

US 2009/0040215 A1 Feb. 12, 2009

(51) Int. Cl.
*G06K 9/00* (2006.01)
(52) U.S. Cl. .................. 382/115; 382/291; 715/863
(58) Field of Classification Search .................. None
See application file for complete search history.

(56) References Cited

U.S. PATENT DOCUMENTS

| | | | | |
|---|---|---|---|---|
| 5,042,073 | A | * | 8/1991 | Collot et al. ................. 382/123 |
| 5,594,469 | A | * | 1/1997 | Freeman et al. ............. 345/158 |
| 6,128,003 | A | * | 10/2000 | Smith et al. ................. 345/157 |
| 7,123,783 | B2 | * | 10/2006 | Gargesha et al. ............ 382/308 |
| 2006/0136846 | A1 | * | 6/2006 | Im et al. ....................... 715/863 |
| 2008/0244465 | A1 | * | 10/2008 | Kongqiao et al. ............ 715/863 |

* cited by examiner

*Primary Examiner* — Brian P Werner

(57) ABSTRACT

Embodiments of the invention include methods and apparatuses relating to identifying hand gestures. In one embodiment, a hand gesture is identified by capturing an image including an image object of the hand gesture, generating a numerical signature based on the image object, and identifying the hand gesture from reference numerical signatures associated with reference hand gestures.

21 Claims, 24 Drawing Sheets

FIG. 5b

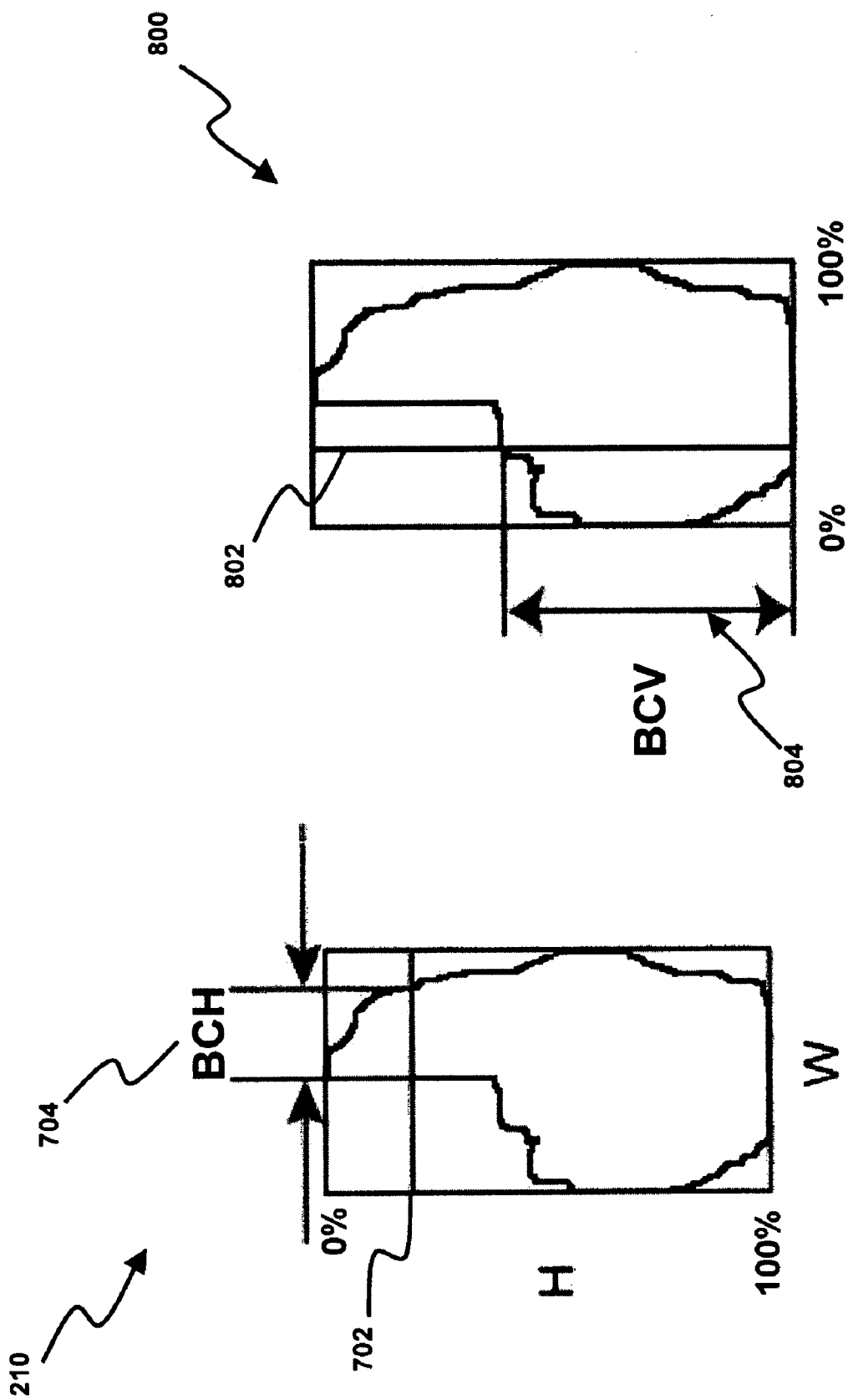

| B | 103 | 88 | 86 | 95 | 78 | 69 | 117 | 85 | 72 |
|---|---|---|---|---|---|---|---|---|---|
| W | 103 | 88 | 86 | 95 | 78 | 69 | 117 | 85 | 72 |
| H | 190 | 161 | 152 | 191 | 162 | 144 | 217 | 163 | 138 |
| W/H | 0.54211 | 0.54658 | 0.56579 | 0.49738 | 0.48148 | 0.47917 | 0.53917 | 0.52147 | 0.52174 |

| F |
|---|

| R | | | | | | | | | | |
|---|---|---|---|---|---|---|---|---|---|---|
| W | 84 | 73 | 68 | 73 | 63 | 58 | 73 | 62 | 66 | 99 | 83 | 70 |
| H | 190 | 164 | 155 | 181 | 153 | 139 | 173 | 142 | 139 | 177 | 157 | 141 |
| W/H | 0.44211 | 0.44512 | 0.43871 | 0.40331 | 0.41176 | 0.41727 | 0.42197 | 0.43662 | 0.47482 | 0.55932 | 0.52866 | 0.49645 |

W

| A | | | | | | | | | |
|---|---|---|---|---|---|---|---|---|---|
| W | 100 | 90 | 80 | 123 | 108 | 111 | 106 | 93 | 84 | 88 | 70 |
| H | 131 | 121 | 106 | 149 | 127 | 127 | 151 | 131 | 119 | 124 | 111 |
| W/H | 0.76336 | 0.7438 | 0.75472 | 0.8255 | 0.85039 | 0.87402 | 0.702 | 0.70992 | 0.70588 | 0.70968 | 0.63063 |

C E I

| K | | | | | | | | |
|---|---|---|---|---|---|---|---|---|
| W | 128 | 115 | 109 | 136 | 119 | 102 | 93 | 86 | 83 | 80 |
| H | 178 | 155 | 141 | 176 | 153 | 136 | 113 | 109 | 100 | 99 |
| W/H | 0.7191 | 0.74194 | 0.77305 | 0.77273 | 0.77778 | 0.75 | 0.823 | 0.79 | 0.83 | 0.808 |

L M N

| O | | | | | | | | |
|---|---|---|---|---|---|---|---|---|
| W | 79 | 68 | 63 | 88 | 79 | 73 | 75 | 69 | 83 | 93 | 74 |
| H | 120 | 109 | 100 | 119 | 107 | 101 | 108 | 101 | 100 | 124 | 113 |
| W/H | 0.65833 | 0.62385 | 0.63 | 0.7395 | 0.73832 | 0.72277 | 0.69444 | 0.68317 | (see T) | | 0.65487 |

|   | Q | | | | | Y | |
|---|---|---|---|---|---|---|---|
| W | 132 | 120 | 104 | 141 | 121 | 104 | |
| H | 107 | 89 | 90 | 130 | 113 | 99 | |
| W/H | 1.2336 | 1.3483 | 1.1556 | 1.0846 | 1.0708 | 1.0505 | |

|   | G | | | H | | | P | |
|---|---|---|---|---|---|---|---|---|
| W | 174 | 152 | 135 | 182 | 158 | 145 | 177 | 170 | 168 |
| H | 85 | 77 | 71 | 80 | 68 | 63 | 87 | 77 | 79 |
| W/H | 2.0471 | 1.974 | 1.9014 | 2.275 | 2.3235 | 2.3016 | 2.0345 | 2.2078 | 2.1266 |

FIG. 9b

INTERPRETING SIGN LANGUAGE GESTURES

BACKGROUND

1. Technical Field

The subject matter disclosed herein generally relates to generating information from hand gestures. More specifically, the subject matter relates to sign language gesture recognition and interpretation using image-processing techniques.

2. Information

Communication skills may be important to a successful life. However, millions of people suffer from impaired speaking and hearing abilities. A significant number of speech and hearing impaired people communicate by sign language, such as American Sign Language (ASL), where letters may be formed by various hand gestures. It may be desirable for people with hearing and speaking disabilities to have their hand gestures translated into readable text or audible speech.

BRIEF DESCRIPTION OF THE DRAWINGS

Embodiments are illustrated by way of example and not by way of limitation in the figures of the accompanying drawings, in which like references may indicate similar elements and in which:

FIGS. 5a-5b illustrate examples of processed images of static hand gestures extracted from the images captured by the image acquisition process of FIG. 3;

FIG. 7 illustrates an example of the measurement of the width and height of the boundary of an image object and the intersection between the image object boundary and a horizontal scanning line;

FIG. 8 illustrates an example of the measurement of the intersection between the boundary of a hand gesture and a vertical scanning line;

FIGS. 9a-9b illustrate examples of the width, the height and the dimensional ratios of image objects from the ASL alphabet;

DETAILED DESCRIPTION

Figure 1:
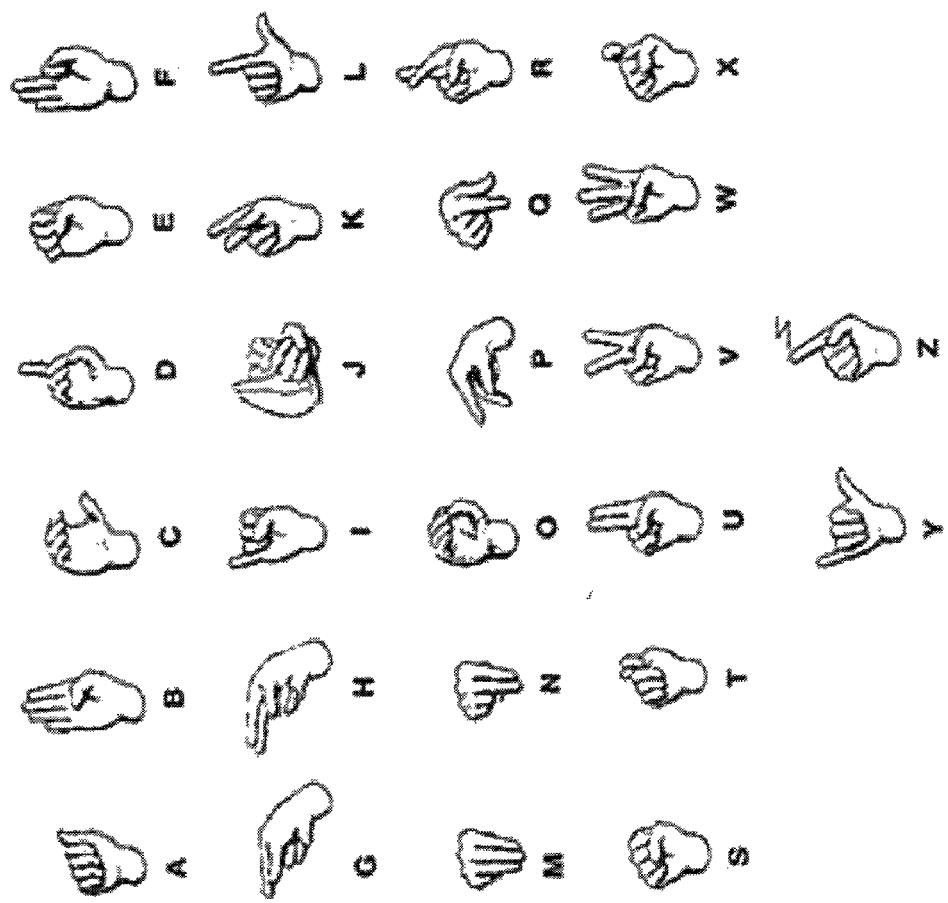
FIG. 1 illustrates the alphabet of letters as represented by hand gestures in American Sign Language.

In the following description, various embodiments will be disclosed. However, it will be apparent to those skilled in the art that the embodiments may be practiced with all or only some of the disclosed subject matter. For purposes of explanation, specific numbers and/or configurations are set forth in order to provide a thorough understanding of the embodiments. However, it will also be apparent to one skilled in the art that the embodiments may be practiced without one or more of the specific details, or with other approaches and/or components. In other instances, well-known structures and/or operations are not shown or described in detail to avoid obscuring the embodiments. Furthermore, it is understood that the embodiments shown in the figures are illustrative representations and are not necessarily drawn to scale.

References throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Parts of the description will be presented in terms of operations performed by a computer system, using terms consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system, and the term computer system includes general purpose as well as special purpose data processing machines, systems, and the like, that are standalone, adjunct or embedded.

Various operations will be described as multiple discrete steps in turn, in a manner that is most helpful in understanding the claimed subject matter. However, the order of description should not be construed as to imply that these operations are necessarily order dependent. In particular, these operations need not be performed in the order of presentation.

In various embodiments of the claimed subject matter, an improved method for identifying hand gestures is facilitated. These and other advantages will be evident from the disclosure.

For purpose of brevity and clarity, the description of the invention is limited hereinafter for use in recognizing hand gestures of the American Sign Language (ASL). However, various embodiments of the invention may be used in applications where other language or instruction gestures are used. For example, various embodiments may be used in situations where observation of radio-silence and noise-discipline are required, such as military group troop movement or in a naval submarine.

Embodiments of the invention are described hereinafter in accordance with FIGS. 1-14 of the drawings.

FIG. 1 illustrates hand gestures corresponding with letters of the alphabet as represented in American Sign Language (ASL) 100. ASL 100 is based on 26 hand gestures. Since the human hand is a complex and flexible structure with many degrees of freedom, it may be necessary to analyze hand constraints to determine a suitable method for recognizing hand gestures.

Figure 2:
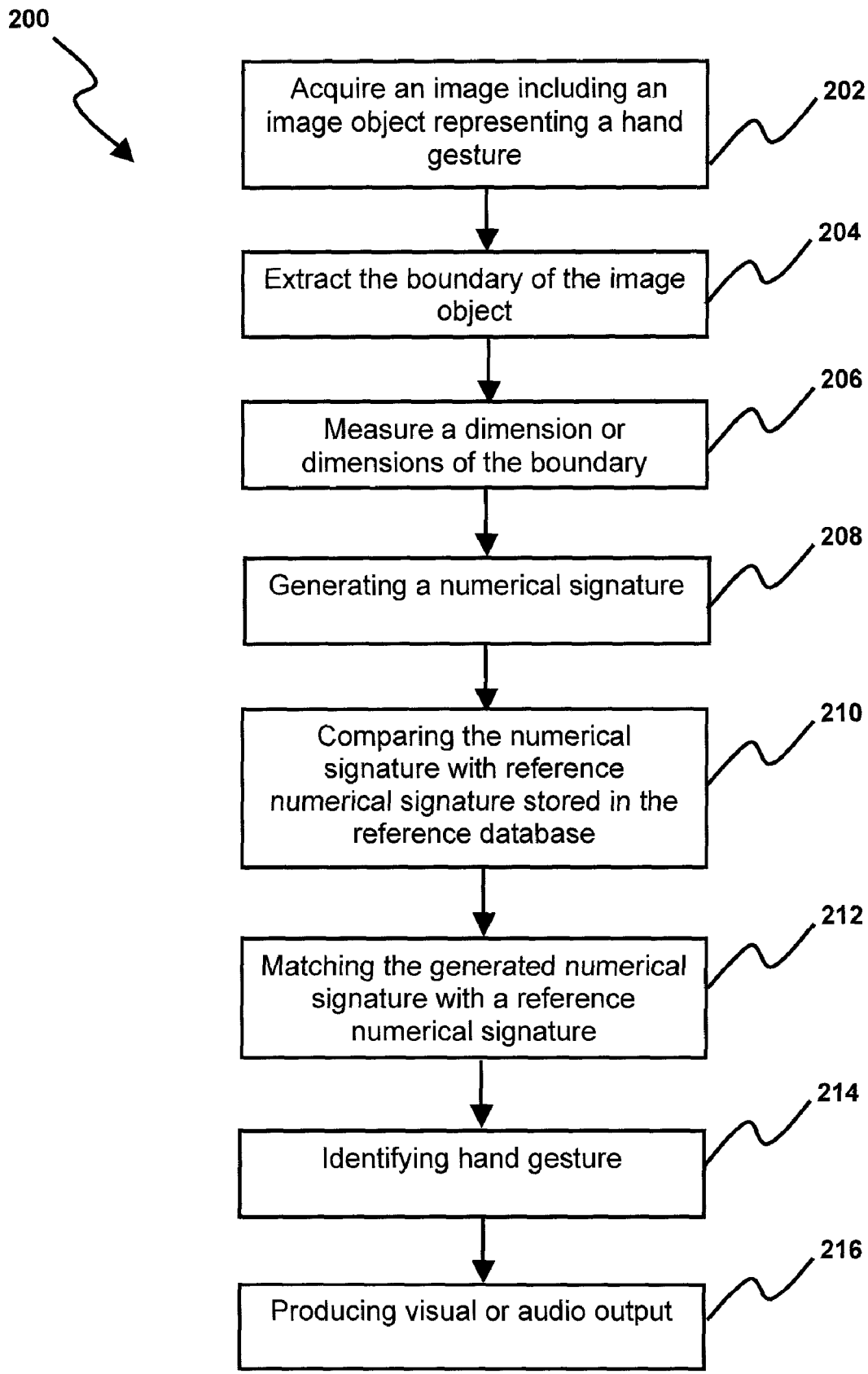
FIG. 2 illustrates a flow diagram of a hand gesture recognition method in accordance with one embodiment of the present invention.

FIG. 2 illustrates a flow diagram of a hand gesture recognition method 200 in accordance with one embodiment. At block 202, an image capture device (not shown), such as a camera, may be used to acquire an image or images including a hand expressing a hand gesture. The hand gesture may be represented as an image object in the image. At block 204, the boundary of the image object may be extracted from the image captured at block 202. With the boundary of the image object extracted at block 204, a dimension, a plurality of dimensions, or other conditions (such as the number of intersections with a scanning line, as is further discussed below) may be measured at block 206 based at least in part on the boundary of the image object. A numerical signature may be generated at block 208, using the dimensions and/or conditions of the boundary measured at block 206. The numerical signature generated at block 208 may then be compared with reference numerical signatures (based at least in part on reference dimensions and reference numerical conditions) predetermined and stored in a reference database, as illustrated at block 210. By matching the numerical signature generated at block 208 with a reference numerical signature that is descriptive of the generated numerical signature, the hand gesture may be identifiable, as shown at block 214. As is further discussed below, a hierarchical structure of reference numerical signatures may facilitate identification of the hand gesture. With the hand gesture recognized at block 214, a visual or audio output may be produced, as illustrated at block 216.

Figure 3:
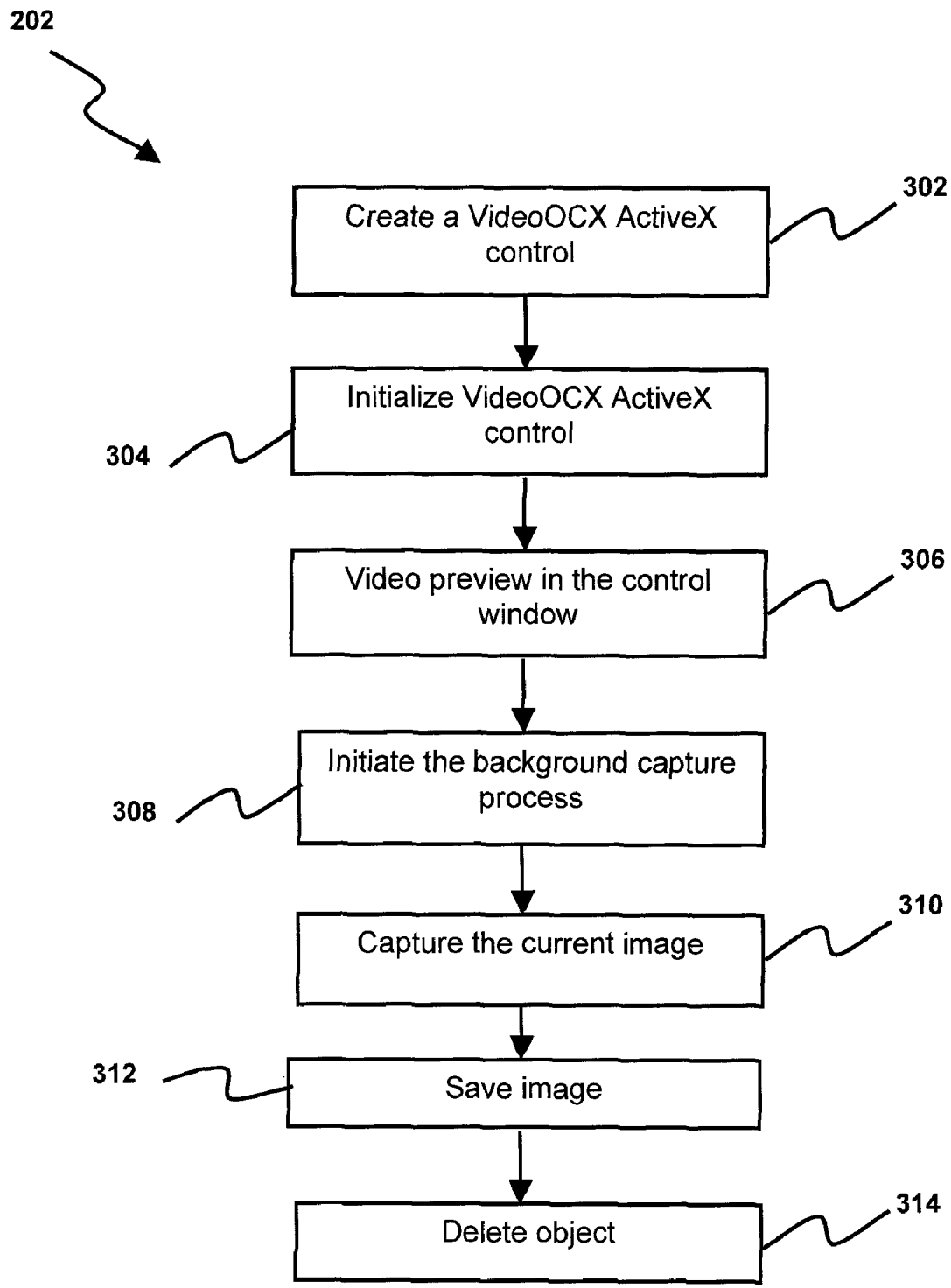
FIG. 3 illustrates a flow diagram of one embodiment of an image acquisition process as shown in the hand gesture recognition method of FIG. 2.

Block 202 of FIG. 2 shows the acquisition of an image of a hand gesture. The flow diagram of FIG. 3 illustrates an image acquisition process in accordance with one embodiment, although other image acquisition processes may be used. As illustrated, image acquisition process 202 may use VideoOCX ActiveX control. VideoOCX ActiveX control, available from Marvelsoft software development company of Berlin, Germany (http://www.videoocx.de), allows integration of video capture and captured image processing capabilities into software applications. VideoOCX ActiveX control may be compatible with most devices, such as Universal Series Bus (USB) cameras. At block 302 of FIG. 3, a VideoOCX ActiveX control may be created and at block 304 VideoOCX ActiveX control may be initialized. Once the VideoOCX ActiveX control is created and initialized, a video preview in the control window may be activated at block 306. A background capture process may be initiated at block 308 and an image may be captured at block 310. The captured image may be saved as a JPEG file or in another file format (e.g., TIFF, GIF, BMP, WDP) at block 312 before deleting the VideoOCX object at block 314. JPEG may be a commonly used standard method of compression for photographic images, based upon the ISO/IEC IS 10918-1 standard (available at http://www.iso.org) and other applicable standards.

Figure 4:
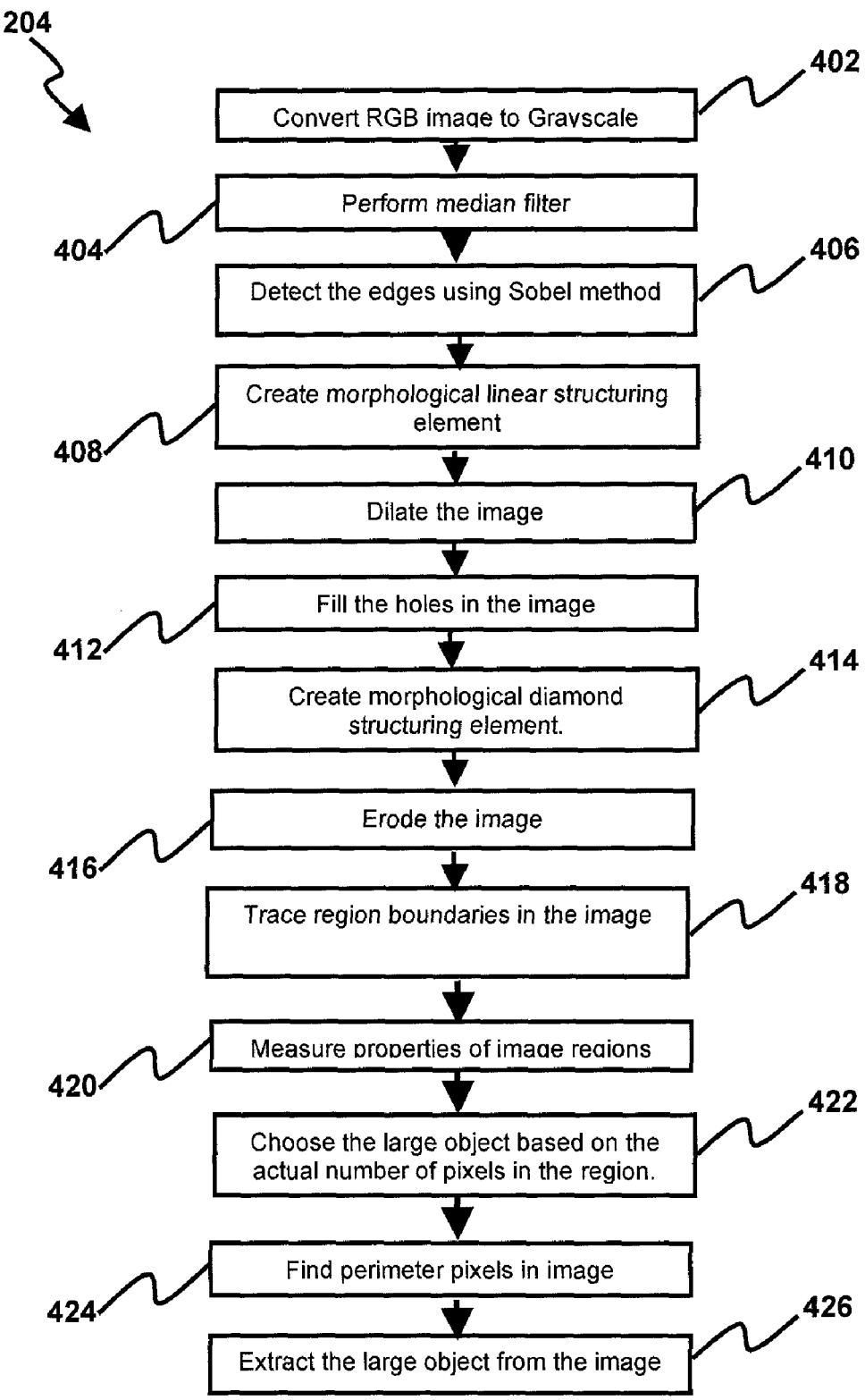
FIG. 4 illustrates a flow diagram of one embodiment of a boundary extraction process of an image object as shown in the hand gestures recognition method of FIG. 2.

At block 204 of hand gesture recognition method 200 illustrated in FIG. 2, the boundary of the image object may be extracted from the captured image. FIG. 4 illustrates a flow diagram of a boundary extraction process in accordance with one embodiment, although other suitable processes may be used. At block 402, the captured image, which may be a RGB (Red-Green-Blue) image, may be converted into a grayscale image by eliminating hue and saturation information while retaining luminance information. With the grayscale image, a median filter may be applied to reduce noise at block 404. A Sobel edge detection algorithm may be applied to the grayscale image to detect the edges as illustrated at block 406. At block 408, a morphological linear structuring element may be created to dilate the grayscale image into a dilated image to help identify closed boundaries therein. Holes in the dilated image may be filled to create an image object at block 412. The image object of block 412 may be eroded based at least in part on a morphological diamond structuring element to help return the real dimension of the dilated image as shown at block 414 and block 416. The region boundaries in the dilated image may be traced at block 418 and the properties of the dilated image regions may be measured at block 420 in order to correctly choose the image object based at least in part on the actual number of pixels in the region at block 422. The perimeter pixels may be located at block 424 and the image object may be extracted from the image at block 426.

Figure 5A:
Figure 5B:
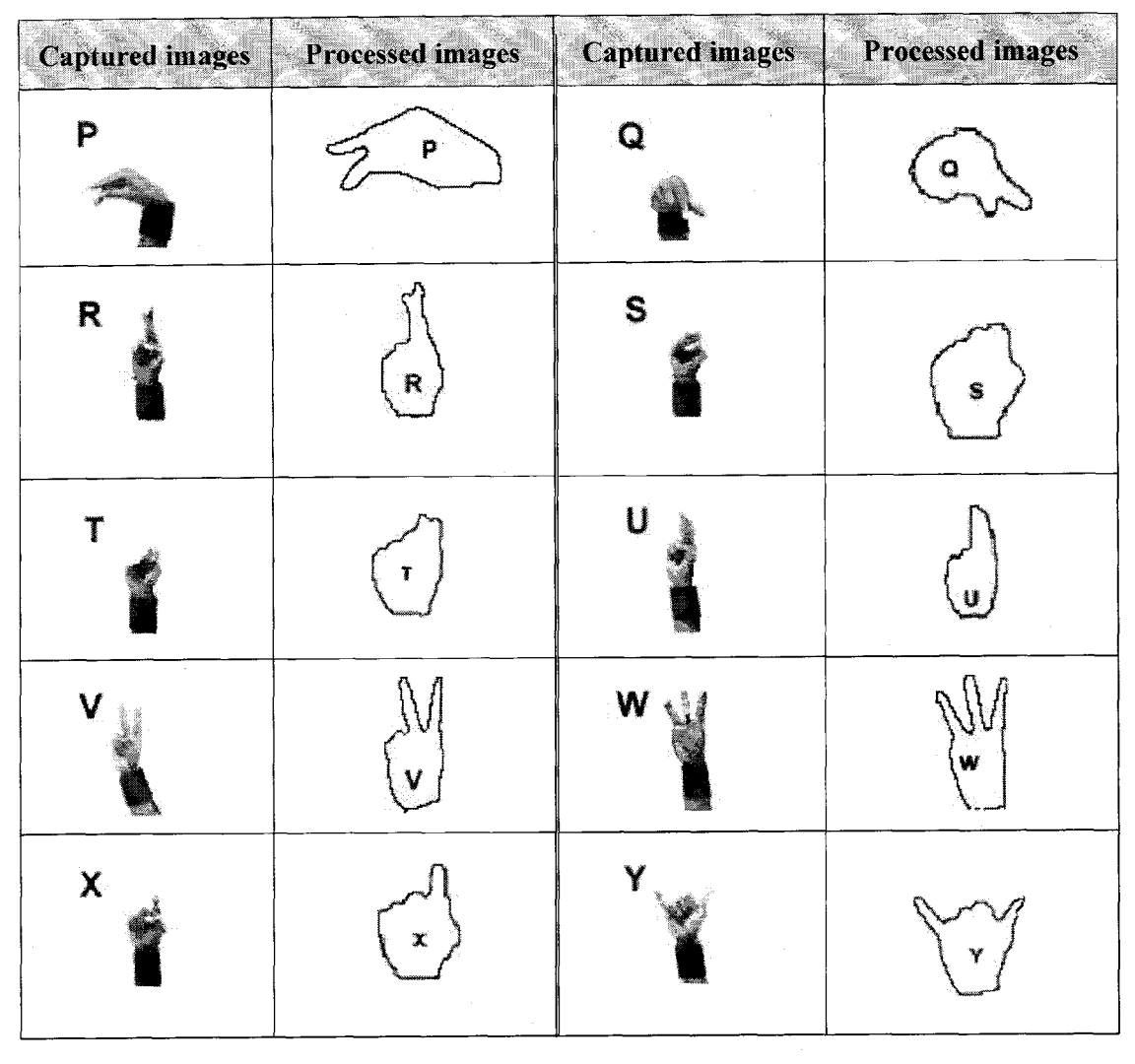
Figure 6:
FIG. 6 illustrates examples of processed images of dynamic hand gestures extracted from the images captured by the image acquisition process of FIG. 3.

FIGS. 5a-5b illustrates examples of captured images and associated processed images of the 24 static hand gestures of ASL. Besides the static hand gestures, ASL also has 2 dynamic hand gestures for letters J and Z. FIG. 6 illustrates examples of captured images and associated processed images of the dynamic hand gestures of ASL.

FIG. 7 illustrates measurement of dimensions and analysis of conditions of an image object in accordance with one embodiment of the claimed subject matter. Dimensions of the image object may be obtained by measuring the width and the height of the image object and by observing the interaction between the boundary of the image object and the horizontal scanning line 702. For example, in FIG. 7, horizontal scanning line 702 may intersect with the boundary of the image object at two points, with horizontal segment 704 being the segment along horizontal scanning line 702 between the intersection points. The width of horizontal segment 704 may be represented in FIG. 7 as BCH. Similarly, FIG. 8 illustrates a vertical scanning line 802 that may intersect the boundary of the image object at two points. Vertical segment 804 may be between the intersection points, and the height of vertical segment 804 may be represented as BCV.

In general, horizontal and vertical scanning lines 702, 802 may be used to scan the boundary of the image object to create various numerical signatures of the image object, such as, but not limited to, the number of intersection points with the boundary, as well as the ratio of the segment length to the height or width of the image object, as is discussed in further detail below. Further, as will be appreciated, horizontal scanning line 702 may be used (or "scanned") at a variety heights of the image object, and vertical scanning line 802 may be scanned along various widths of the image object. The scanning height or width may be given as a percentage along the height or width of the image object. For example, a horizontal scanning line may be scanned at 20% below the top height of the image object, or a vertical scanning line may be scanned at 20% along the width of the image object (that is, 20% from the left edge of the image object).

Referring back to FIG. 2, a numerical signature may be generated at block 208. Generally, a numerical signature may represent a shape and physical structure of an image object. In various embodiments, a numerical signature may represent numerical quantification of an image object and may comprise dimensional ratios. In one embodiment, the dimensional ratio may be calculated from the width and height of the measured boundary as follows:

$$d_1 = \frac{W}{H},$$

wherein $d_1$ may be the dimensional ratio, W may be the width of the image object, and H may be the height of the image object. Numerical signatures according to other embodiments of the present invention are discussed in further detail below. FIGS. 9a-9b illustrate tables of example reference widths, heights, and dimensional ratios for the ASL alphabet.

The generated numerical signature or signatures and any condition or conditions may be compared with reference numerical signatures and numerical conditions, which may be predetermined and stored in the reference database as illustrated in FIG. 2 at block 210. The reference numerical signature may be attributable to the image of the hand and the hand gesture.

In one embodiment, the database may comprise reference numerical signatures and reference numerical conditions having a hierarchical structure as illustrated by hand gesture recognition system 1000 in FIGS. 10a-10j. Reference numerical signatures may comprise numerical signatures of image objects of hand gestures, for example, hand gestures of ASL 100 as shown in FIG. 1.

Figure 10A:
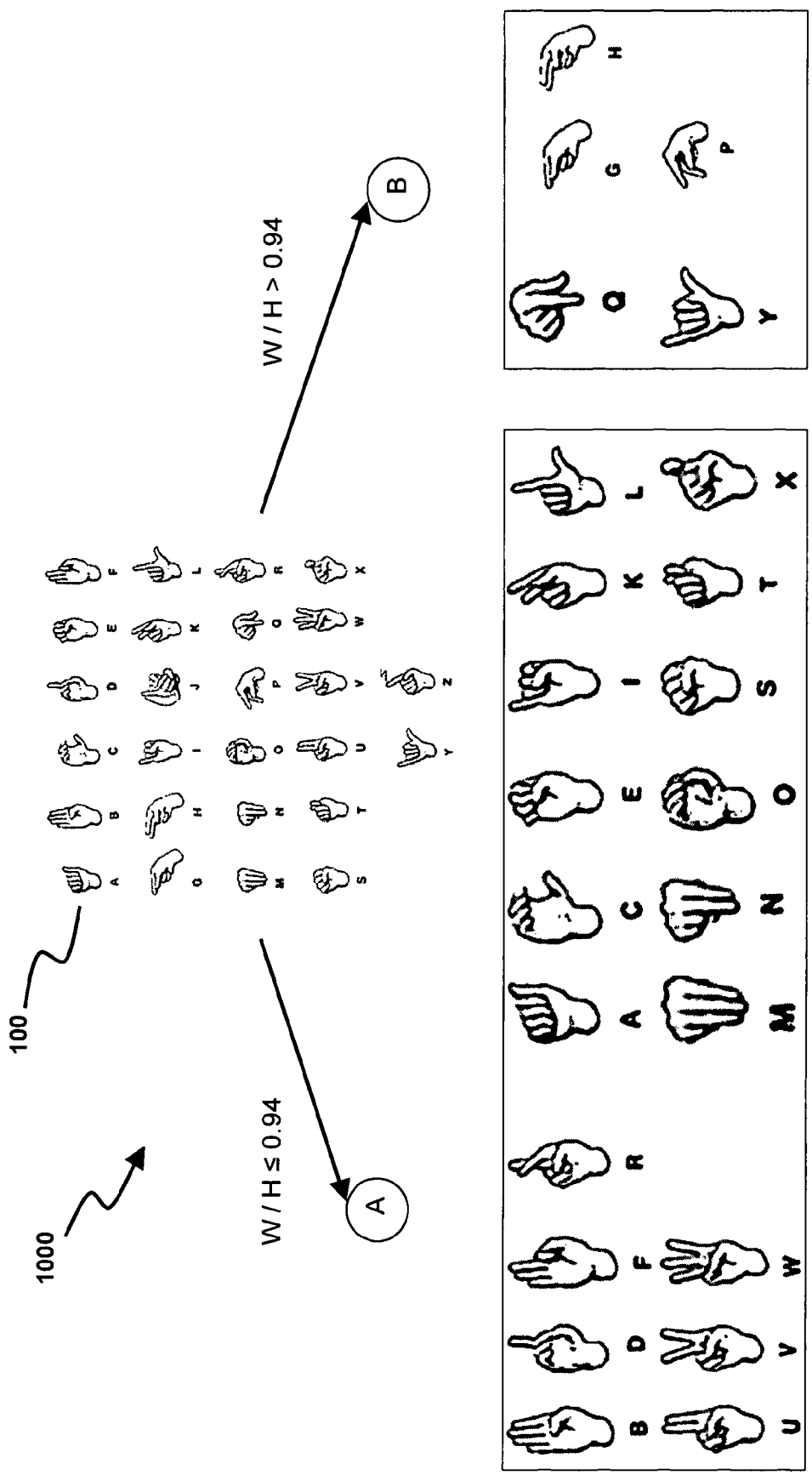
FIGS. 10a-10j illustrate a hand gesture recognition system in accordance with one embodiment of the present invention.

FIGS. 10a-10j illustrate a hand gesture recognition system in accordance with one embodiment of the present invention. The image objects of the hand gestures may be categorized in different nodes based at least in part on the numerical signatures and/or numerical conditions of each image object. An image object may be recognized by comparing the numerical signature generated to represent an image object of a hand gesture with the reference numerical signatures that represent the image objects of hand gestures. In FIG. 10a; all image objects of the static ASL hand gestures may be categorized into two nodes based at least in part on a dimensional ratio that may be defined according to the following equation:

$$d_1 = \frac{W}{H},$$

wherein $d_1$ may be the dimensional ratio, W may be the width of the image object, and H may be the height of the image object. Image objects of hand gestures with $d_1$ less than or equal to about 0.94 may be categorized under Node A (including image objects for letters A, B, C, D, E, F, I, K, L, M, N, O, R, S, T, U, V, W and X). The remaining image objects of hand gestures for letters G, H, Q, P and Y may be categorized under Node B due to $d_1$ of each being greater than about 0.94.

Figure 10B:
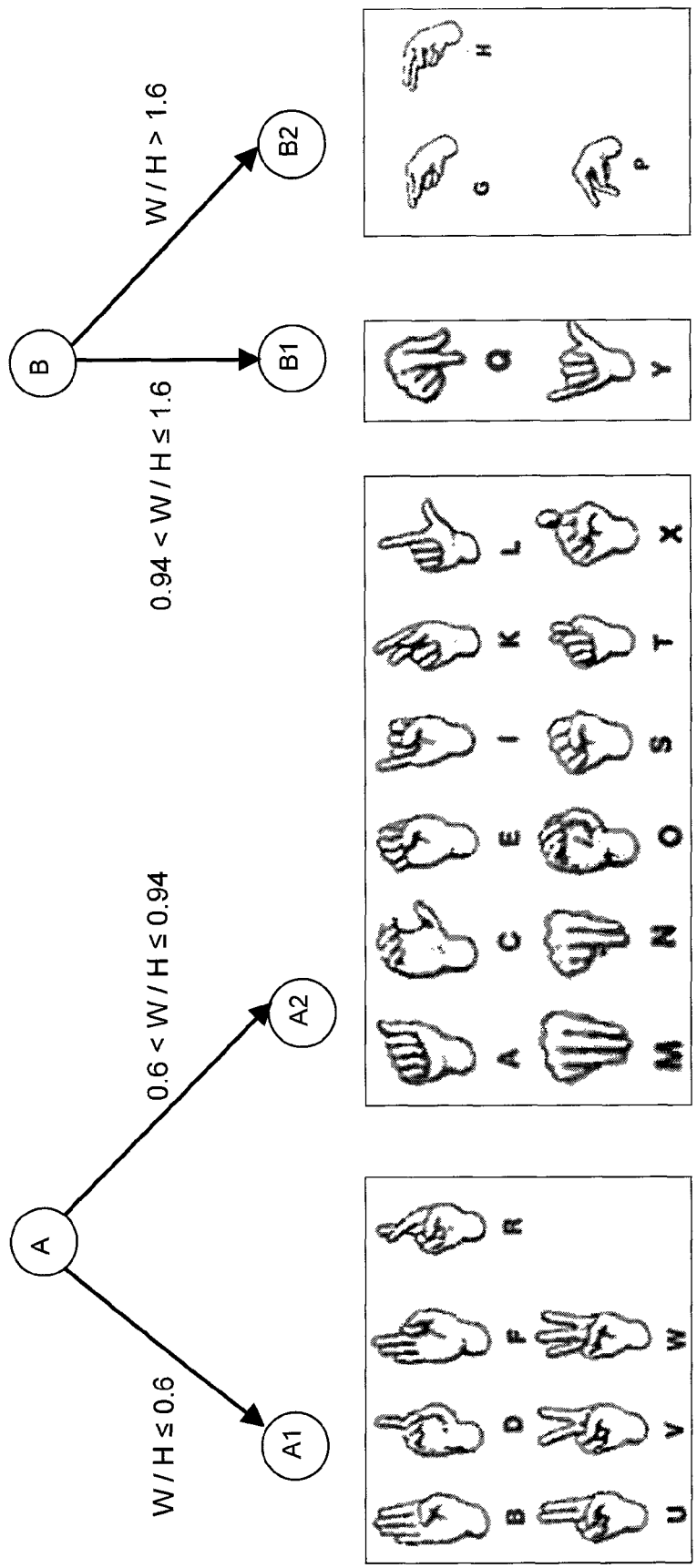

As illustrated in FIG. 10b; the image objects of hand gestures categorized under Node A may be further divided into Nodes A1 and A2. Image objects of hand gestures with $d_1$ less than or equal to about 0.6 may be categorized under Node A1 (including image objects for letters B, D, F, R, U, V and W). Image objects of hand gestures with $d_1$ greater than about 0.6 and less than or equal to about 0.94 may be categorized under Node A2 (including image objects for letters A, C, E, I, K, L, M, N, O, S, T and X).

Also as illustrated in FIG. 10b; the image objects of hand gestures categorized under Node B may be further divided into Nodes B1 and B2. Image objects of hand gestures with $d_1$ greater than about 0.94 and less than or equal to about 1.6 may be categorized under Node B1 (including image objects for letters Q and Y). Image objects of hand gestures with $d_1$ greater than 1.6 may be categorized under Node B2 (including image objects for letters G, H and P).

Figure 10C:
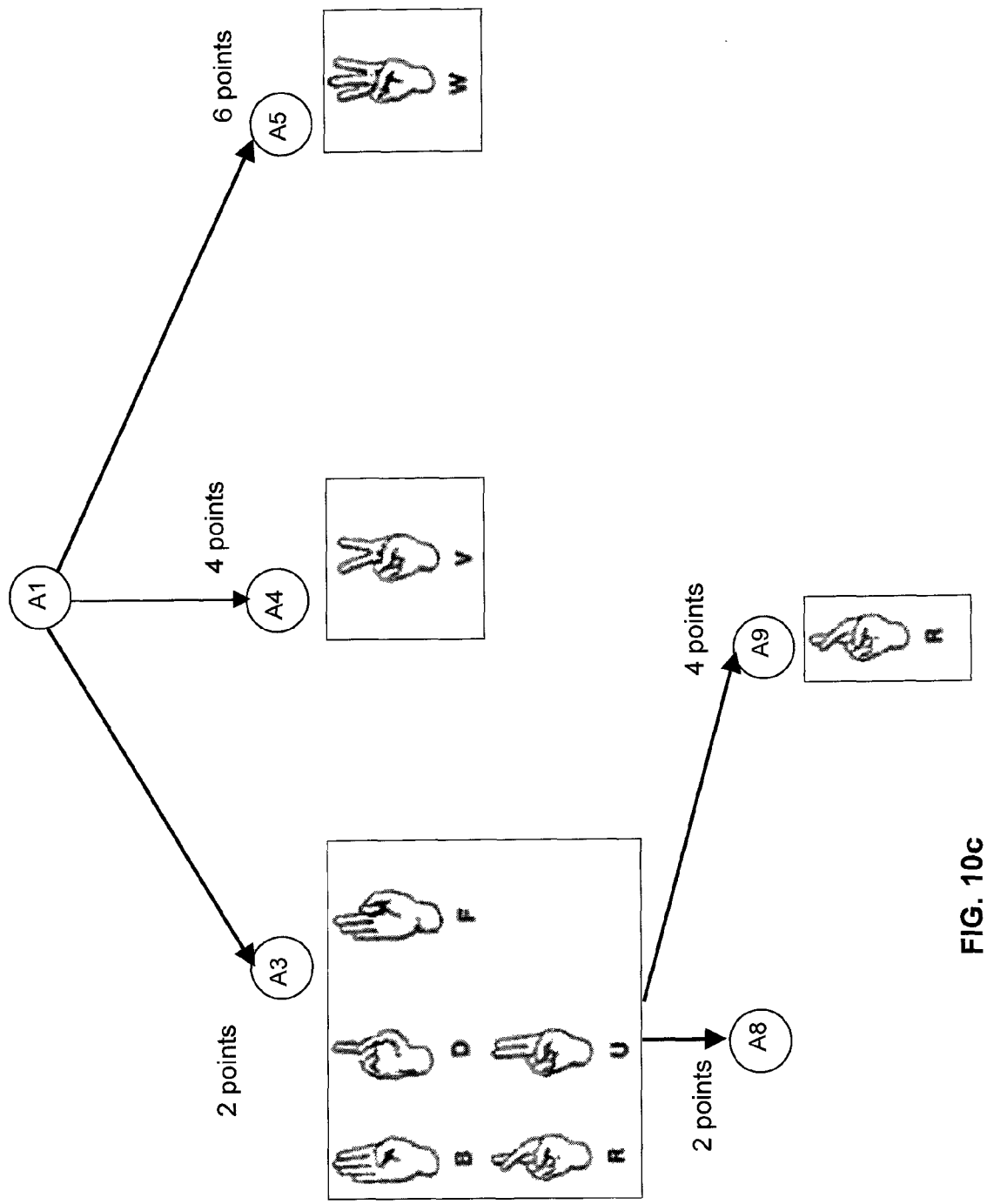

As illustrated in FIG. 10c; the image objects of hand gestures categorized under Node A1 may be further categorized under Nodes A3, A4 and A5 based at least in part on the numerical signature or condition of the number of intersection points between the boundary of the image object and horizontal scanning line 702. The number of intersection points for categorization into Nodes A3, A4, and A5 may be based at least in part on a horizontal scanning at height of about 17% below the top height of the image object. The horizontal scanning may be from left to right and may count the number of intersection points between the boundary of the image object and horizontal scanning line 702. Image objects with 2 intersection points may be categorized under Node A3 (including image objects for letters B, D, F, R and U). Image objects with 4 intersection points may be categorized under Node A4 (including the image object for letter V). Image objects with 6 intersection points may be categorized under Node A5 (including the image object for letter W).

Also as illustrated in FIG. 10c; Node A3 may be further divided into Nodes A8 and A9 based at least in part on the numerical signature or condition of the number of intersection points between the boundary of the image and vertical scanning line 802 taken at about 34% of the width of the image object (with 0% being at the left of the image object and 100% being at the right of the image object as illustrated in FIG. 8). Image objects with 2 intersection points may be categorized under Node A8 (including image objects for letters B, D, F, U, and maybe R). Image objects with 4 intersection points may be categorized under Node A9 (possibly including the image object for letter R). The image object for letter R may be categorized in Node A9 or Node A8 depending on whether 2 or 4 intersection points are detected. If the image object for letter R has 2 intersection points, it may be further categorized in Node A21 as is further discussed below.

Figure 10D:
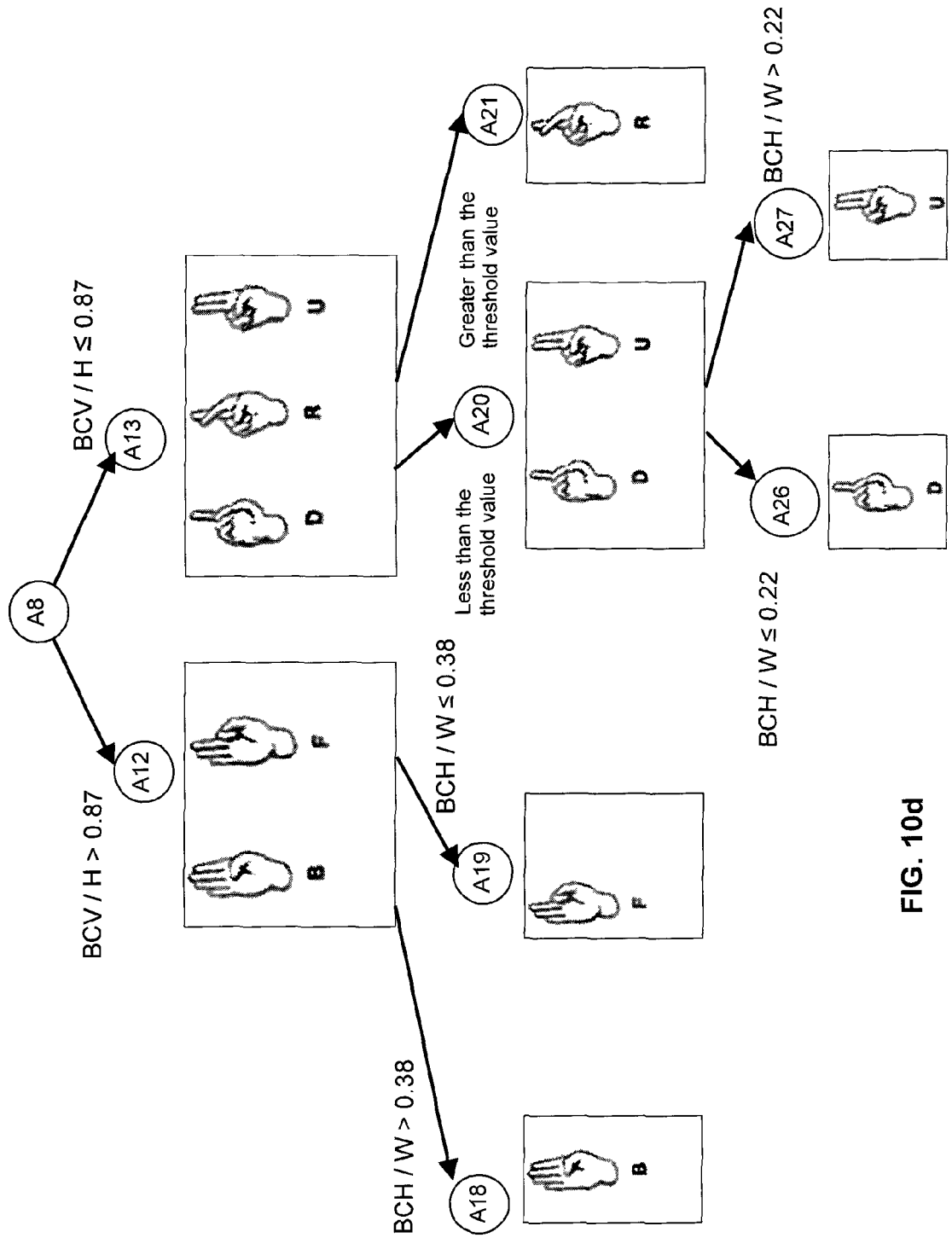

As illustrated in FIG. 10d; the image objects for hand gestures categorized under Node A8 may be further divided into Nodes A12 and A13 using a numerical signature of the dimensional ratio which may be defined according to the following equation:

$$d_2 = \frac{BCV}{H},$$

wherein $d_2$ may be the dimensional ratio, BCV may be the length of a segment between two intersection points of the boundary of the image object and vertical scanning line 802 taken at about 34% of the width of the image object, and H may be the height of the image object. Image objects with $d_2$ greater than about 0.87 may be categorized under Node A12 (including image objects for letters B and F). Image objects for hand gestures with $d_2$ less than or equal to about 87% may be categorized under Node A13 (including image objects for letters D, R and U).

Image objects for hand gestures categorized under Node A12 may be further divided into Nodes A18 and A19, as illustrated in FIG. 10d; using a dimensional ratio which may be defined according to the following equation:

$$d_3 = \frac{BCV}{H},$$

wherein $d_3$ may be the dimensional ratio, BCH may be the length of a segment between two intersection points of the boundary of the image object and horizontal line 702 taken at about 12% down from the top height of the image object, and W may be the width of the image object. Image objects for hand gestures with $d_3$ greater than about 0.38 may be categorized under Node A18 (including the image object for the letter B). Image objects for hand gestures with $d_3$ less than or equal to about 0.38 may be categorized under Node A19 (including the image object for the letter F).

Also as illustrated in FIG. 10*d*; image objects for hand gestures categorized under Node A13 may be further divided into Nodes A20 and A21 by using a numerical signature determined by comparing the widths of the segments created by the intersection between the image object boundary and horizontal scanning line 702 by scanning from left to right at about 6%, 11% and 22% from the top height of the image object. If the widths of the segments are approximately equal, the image objects may be categorized under Node A20 (including image objects for the letters D and U). If the widths of the segments are not approximately equal, the image objects for hand gestures may be categorized under Node A21 (including the image object for the letter R). To determine whether the widths of the segments are approximately equal, a threshold value may be used. The variation of the widths may be compared to the threshold value to determine whether the hand gesture is categorized in Node A20 or Node A21.

As further illustrated in FIG. 10*d*; image objects categorized in Node A20 may be further divided into Nodes A26 and A27 using a numerical signature based at least in part on a dimensional ratio which may be defined according to the following equation:

$$d_4 = \frac{BCH}{W},$$

wherein $d_4$ may be the dimensional ratio, BCH may be the length of a segment between two intersection points of the boundary of the image object and horizontal scanning line 702 taken at about 11% down from the top of the image object, and W may be the width of the image object. Image objects with $d_4$ less than or equal to about 0.22 may be categorized under Node A26 (including the image object for the letter D). Image objects for hand gestures with $d_4$ greater than about 0.22 may be categorized under Node A27 (including the image object for the letter U).

Figure 10E:
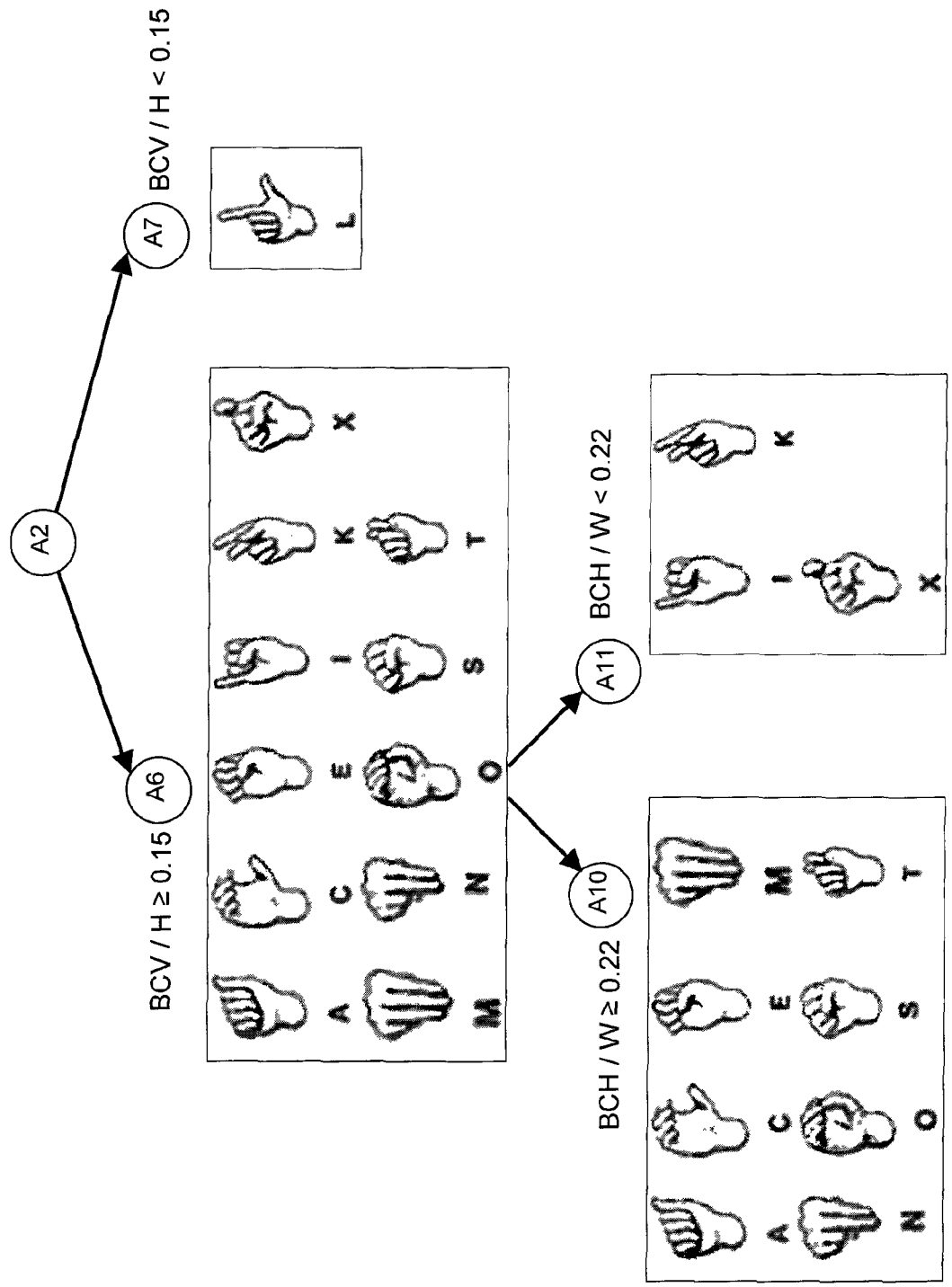

As illustrated in FIG. 10*e*; image objects for hand gestures categorized under Node A2 (please refer to FIG. 10*b*) may be further divided into Nodes A6 and A7 using a numerical signature based at least in part on a dimensional ratio which may be defined according to the following equation:

$$d_5 = \frac{BCV}{H},$$

wherein $d_5$ may be the dimensional ratio, BCV may be the maximum value of the lengths of segments between two intersection points of the boundary of the image object and vertical scanning line 802 taken at about 82%, 85%, 90%, and 92% of the width of the image object, and H may be the height of the image object. Image objects with $d_5$ greater than or equal to about 0.15 may be categorized under Node A6 (including image objects for the letters A, C, E, I, K, X, M, N, O, S and T). Image objects with $d_5$ lesser than 0.15 may be categorized under Node A7 (including the image object for the letter L).

As also illustrated in FIG. 10*e*; image objects for hand gestures categorized under Node A6 may be further divided into Nodes A10 and A11 using a numerical signature based at least in part on a dimensional ratio which may be defined according to the following equation:

$$d_6 = \frac{BCH}{W},$$

wherein $d_6$ may be the dimensional ratio, BCH may be the length of a segment between two intersection points of the boundary of the image object and horizontal scanning line 702 taken at about 12% down from the top of the image object, and W may be the width of the image object. Image objects with $d_6$ greater than or equal to about 0.22 may be categorized under Node A10 (including image objects for letters A, C, E, M, N, O, S and T). Image objects for hand gestures with $d_6$ less than about 0.22 may be categorized under Node A11. (including image objects for letters I, K and X).

Figure 10F:
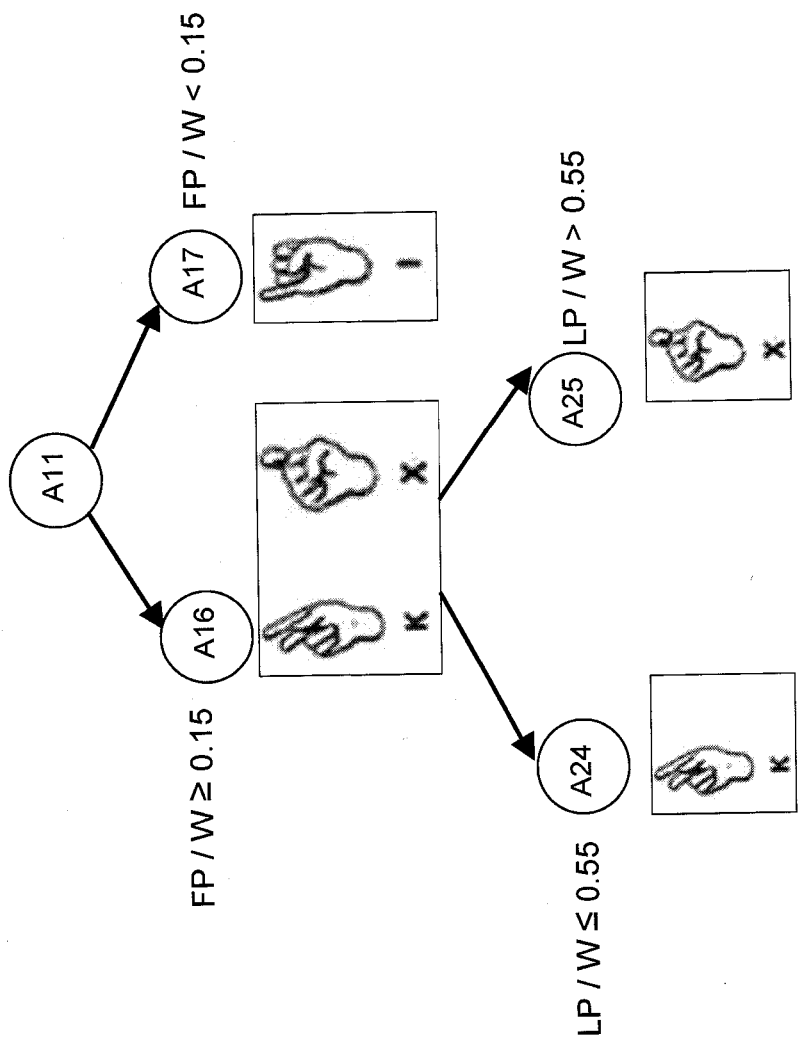

As illustrated in FIG. 10*f*; image objects for hand gestures categorized under Node A11 may be further divided into Nodes A16 and A17 using a numerical signature based at least in part on a dimensional ratio which may be defined according to the following equation:

$$d_7 = \frac{FP}{W},$$

wherein $d_7$ may be the dimensional ratio, FP may be the length from the left edge of the image object to the first pixel where the boundary of the image object intersects vertical scanning line 802, and W may be the width of the image object. Image objects for hand gestures with $d_7$ greater than or equal to about 0.15 may be categorized under Node A16 (including image objects for the letters K and X). Image objects for hand gestures with $d_7$ lesser than about 0.15 may be categorized under Node A17 (including the image object for the letter I).

As also illustrated in FIG. 10*f*; image objects for hand gestures categorized under Node A16 may be further divided into Nodes A24 and A25 using a numerical signature based at least in part on a dimensional ratio which may be defined according to the following equation:

$$d_8 = \frac{LP}{W},$$

wherein $d_8$ may be the dimensional ratio, LP may be the length from the left edge of the image object to the last pixel where the boundary of the image object intersects vertical scanning line 802, and W may be the width of the image object. Image objects for hand gestures with $d_8$ less than or equal to about 0.55 may be categorized under Node A24 (including the image object for the letter K). Image objects for hand gestures with $d_8$ greater than about 0.55 may be categorized under Node A25 (including the image object for the letter X).

Figure 10G:
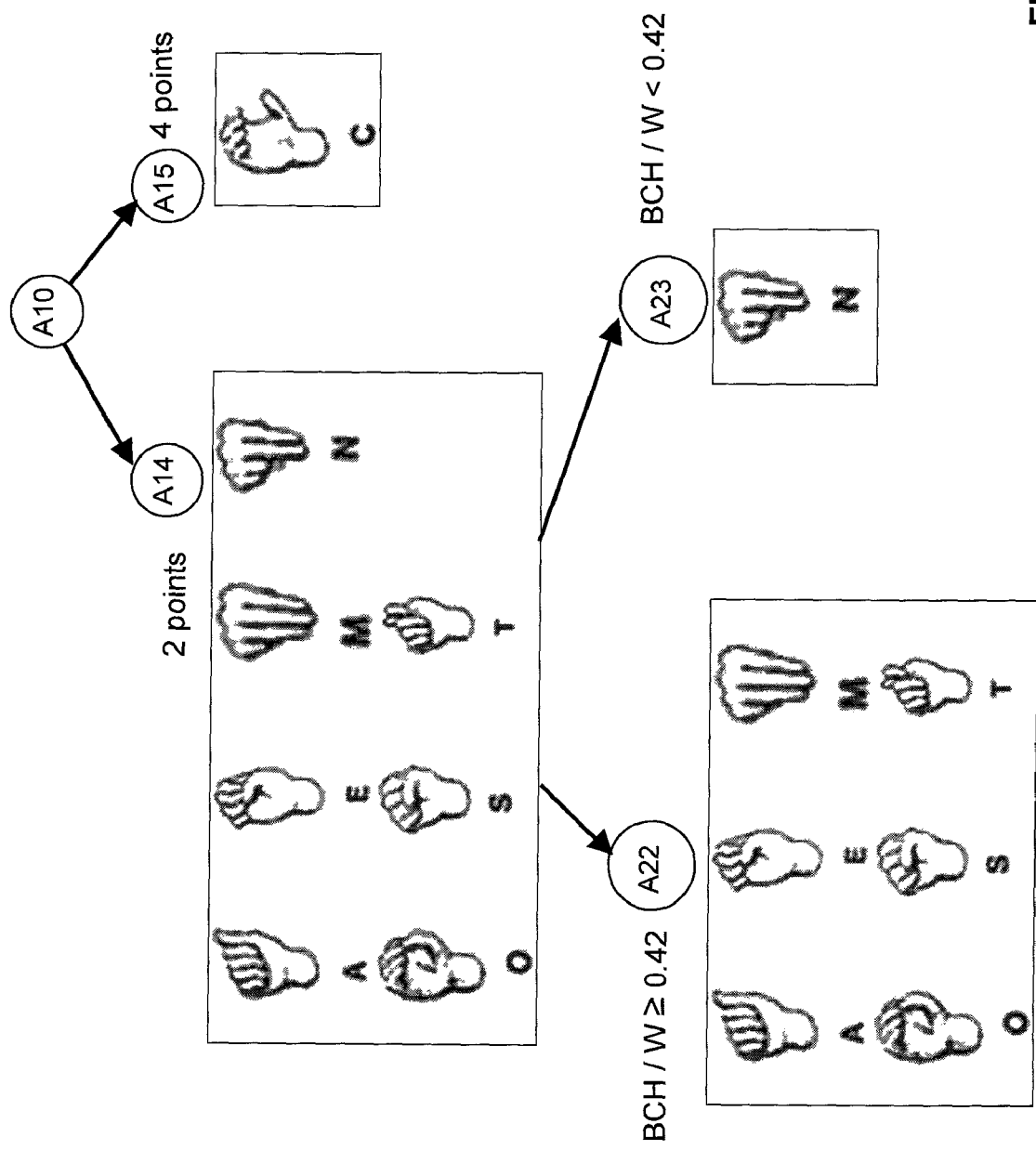

As illustrated in FIG. 10*g*; image objects for hand gestures categorized under Node A10 (please refer to FIG. 10*e*) may be divided into Nodes A14 and A15 using a numerical condition based at least in part on scanning along horizontal scanning line 702 from left to right at about 40% from the top height of the image object and counting the number of intersection points between the image object boundary and horizontal scanning line 702. Image objects with 2 intersection points may be categorized under Node A14 (including image objects for letters A, E, M, N, O, S and T). Image object with 4 intersection points may be categorized under Node A15 (including the image object for letter C).

Image objects for hand gestures categorized under Node A14 may be further divided into Node A22 and Node A23, as illustrated in FIG. 10g; using a numerical signature based at least in part on a dimensional ratio which may be defined according to the following equation:

$$d_9 = \frac{BCH}{W},$$

wherein $d_9$ may be the dimensional ratio, BCH may be the length of a segment between two intersection points of the boundary of the image object and horizontal scanning line 702 taken at about 80% down from the top height of the image object, and W may be the width of the image object. Image objects with $d_9$ greater than or equal to about 0.42 may be categorized under Node A22 (including image objects for letters A, E, M, O, S and T). Image objects with $d_9$ less than about 0.42 may be categorized under Node A23 (including the image object for the letter N).

Figure 10H:
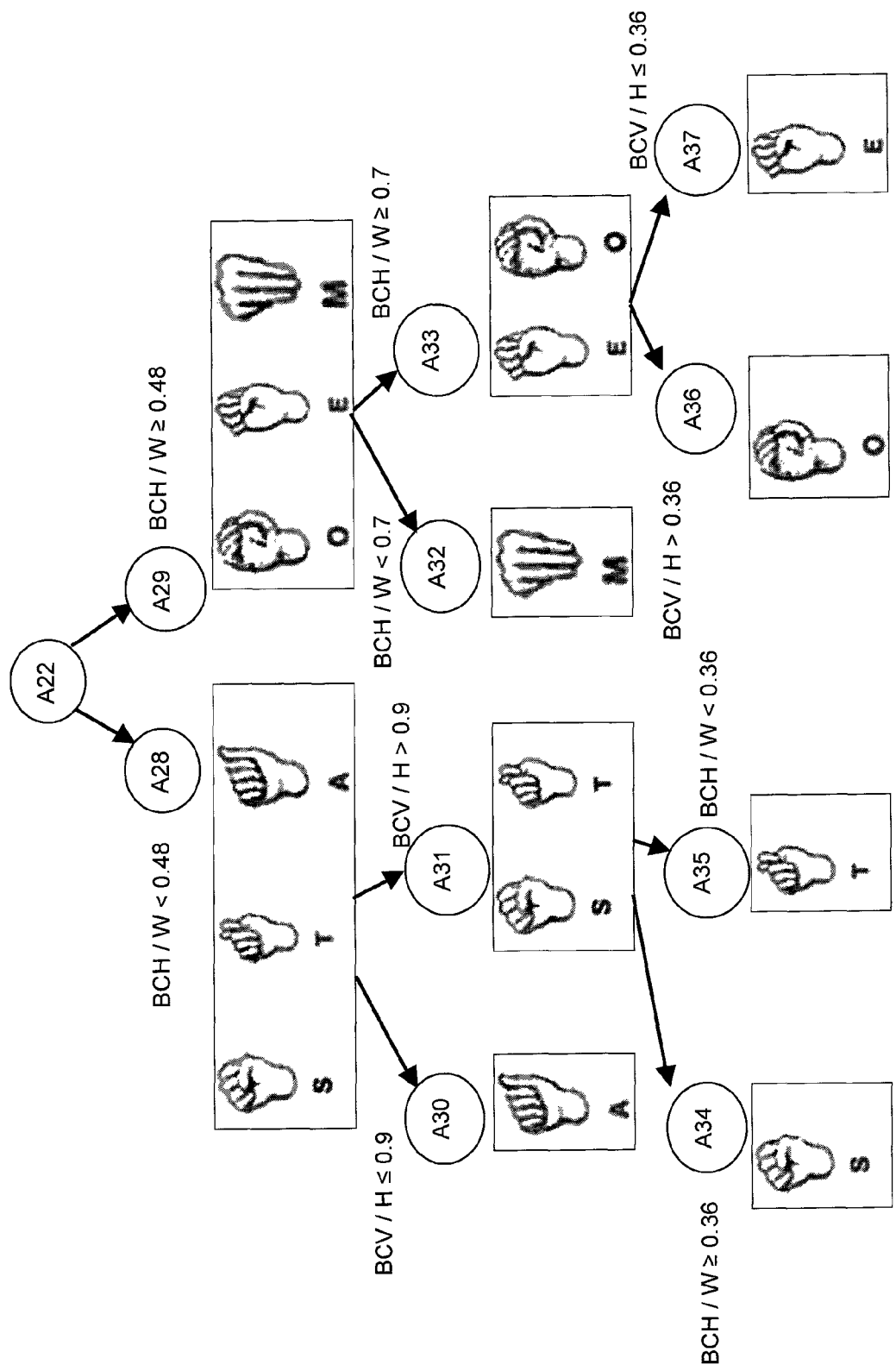

Image objects for hand gestures categorized under Node A22 may be divided into Nodes A28 and A29 as illustrated in FIG. 10h. The image objects for hand gestures may be categorized under Node A28 and A29 using a numerical signature based at least in part on a dimensional ratio which may be defined according to the following equation:

$$d_{10} = \frac{BCH}{W},$$

wherein $d_{10}$ may be the dimensional ratio, BCH may be the length of a segment between two intersection points of the boundary of the image object and horizontal scanning line 702 taken at about 8% down from the top of the image object, and W may be the width of the image object. Image objects with $d_{10}$ less than about 0.48 may be categorized under Node A28 (including image objects for letters S, T and A). Image objects with $d_{10}$ greater than or equal to about 0.48 may be categorized under Node A29 (including image objects for letters O, E and M).

The image objects for hand gestures categorized under Node A28 may be divided into Node A30 and A31 as shown in FIG. 10h. The image objects for hand gestures may be categorized using a dimensional ratio which may be defined according to the following equation:

$$d_{11} = \frac{BCV}{H},$$

wherein $d_{11}$ may be the dimensional ratio, BCV may be the length of a segment obtained by drawing a vertical scanning line 802 from the point where pixel equals to 1 on the first line, and H may be the height of the image object. Image objects with $d_{11}$ less than or equal to about 0.9 may be categorized under Node A30 (including the image object for the letter A). Image objects with $d_{11}$ greater than about 0.9 may be categorized under Node A31 (including image objects for letters S and T).

Image objects for hand gestures categorized under Node A31 may be further divided into Nodes A34 and A35 as illustrated in FIG. 10h. The image objects may be categorized using a numerical signature based at least in part on a dimensional ratio which may be defined according to the following equation:

$$d_{12} = \frac{BCH}{W},$$

wherein $d_{12}$ may be the dimensional ratio, BCH may be the length of a segment between two intersection points of the boundary of the image object and horizontal scanning line 702 taken at about 10% down from the top of the image object, and W may be the width of the image object. Image objects with $d_{12}$ greater than or equal to about 0.36 may be stored in Node A34 (including the image object for the letter S). Image objects with $d_{12}$ less than about 0.36 may be categorized under Node A35 (including the image object for the letter T).

Image objects for hand gestures stored in Node A29 may be categorized into Node A32 and Node A33 using a numerical signature based at least in part on a dimensional ratio which may be defined according to the following equation:

$$d_{13} = \frac{BCH}{W},$$

wherein $d_{13}$ may be the dimensional ratio, BCH may be the length of a segment between two intersection points of the boundary of the image object and horizontal scanning line 702 taken at about 80% down from the top of the image object, and W may be the width of the image object. Image objects with $d_{13}$ less than about 0.7 may be categorized under Node A32 (including the image object for the letter M). Image objects with $d_{13}$ greater than or equal to about 0.7 may be categorized under Node A33 (including image objects for letters E and O).

Image objects for hand gestures categorized under Node A33 may be further divided into Node A36 and A37 using numerical signature based at least in part on a dimensional ratio which may be defined according to the following equation:

$$d_{14} = \frac{BCV}{H},$$

wherein $d_{14}$ may be the dimensional ratio, BCV may be the length of a segment between two intersection points of the boundary of the image object and vertical scanning line 802 taken at about 94% of the width of the image object, and H may be the height of the image object. Image objects with $d_{14}$ greater than about 0.36 may be categorized under Node A36 (including the image object for letter O). Image objects for hand gestures with $d_{14}$ less than or equal to about 0.36 may be categorized under Node A37 (including the image object for the letter E).

Figure 10I:
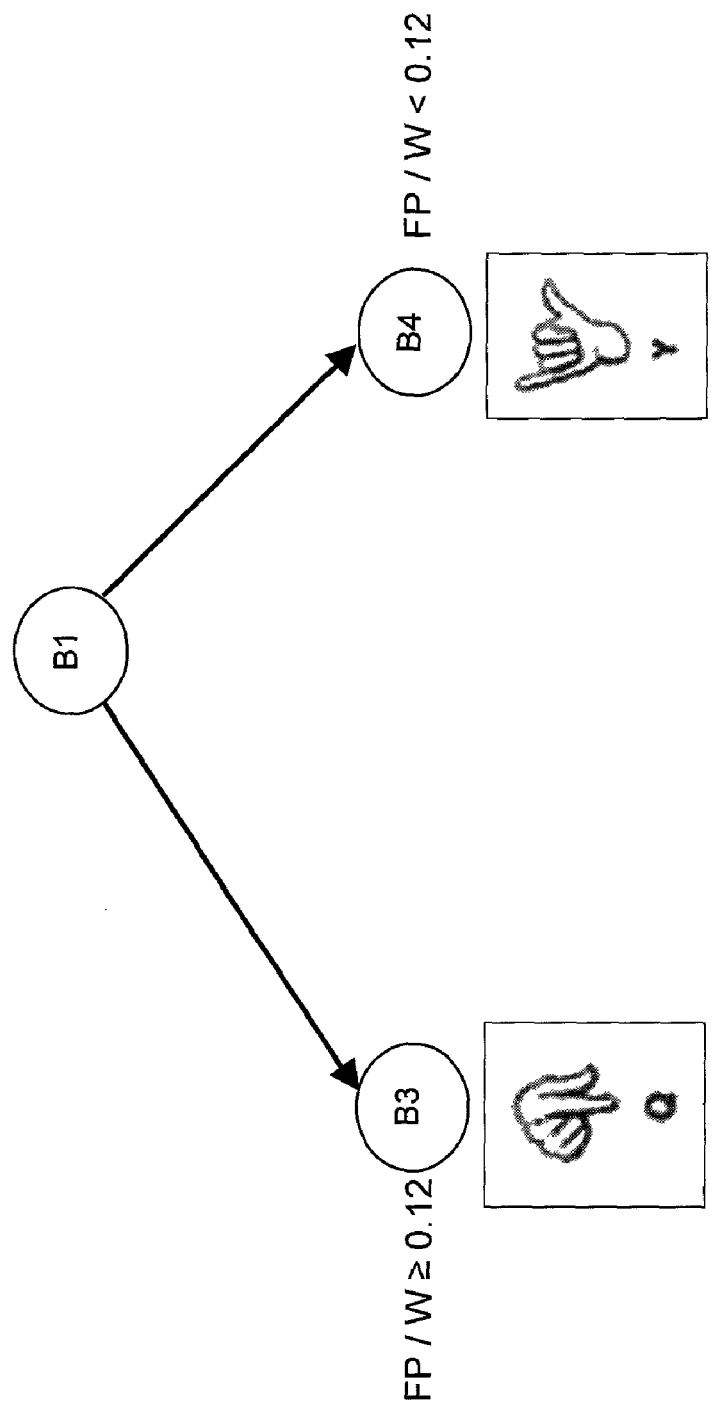

As illustrated in FIG. 10i; image objects for hand gestures categorized under Node B1 (please see FIG. 10b) may be divided into Nodes B3 and B4 using a numerical signature based at least in part on a dimensional ratio which may be defined according to the following equation:

$$d_{15} = \frac{FP}{W},$$

wherein $d_{15}$ may be the dimensional ratio, FP may be the length from the left edge of the image object to the first pixel where the boundary of the image object intersects the vertical scanning line 802, and W may be the width of the image object. Image objects with $d_{15}$ greater than or equal to about 0.12 may be categorized under B3 (including the image object for the letter Q). Image objects with $d_{15}$ less than about 0.12 may be categorized under Node B4 (including the image object for the letter Y).

Figure 10J:
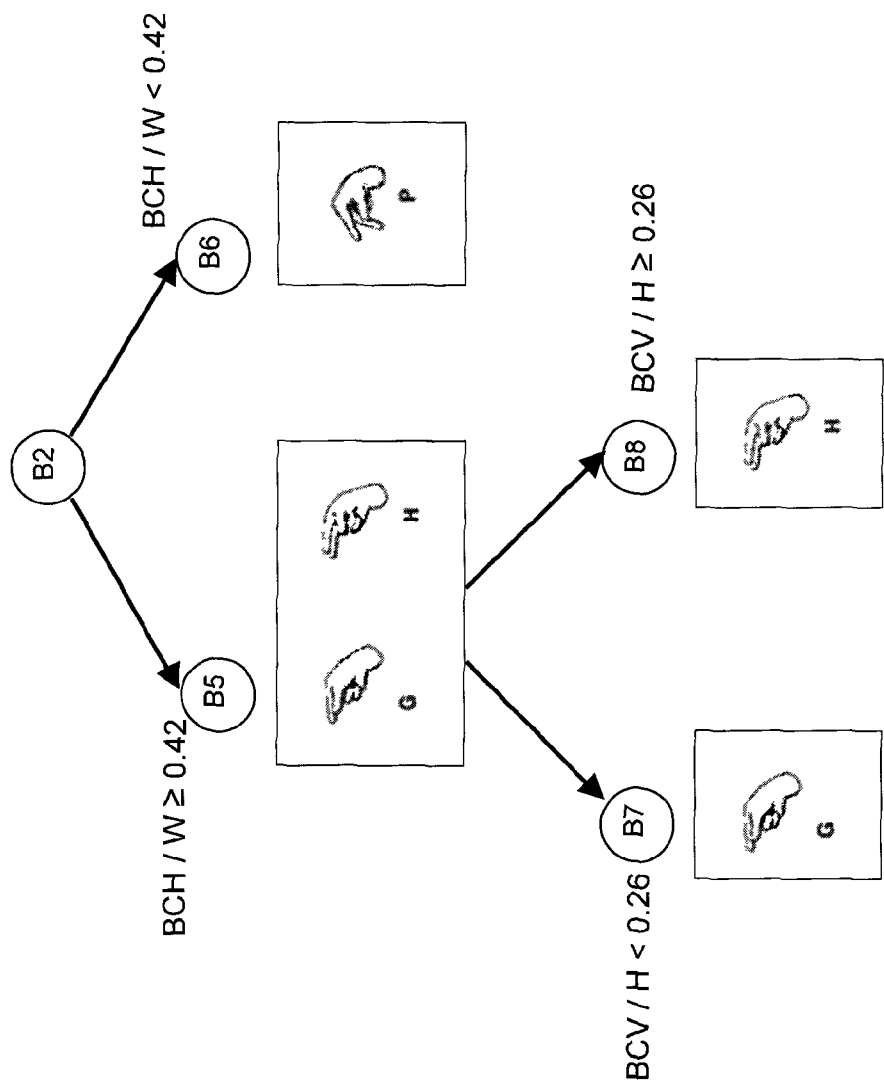

As illustrated in FIG. 10*j*; image objects for hand gestures categorized under Node B2 (please refer to FIG. 10*b*) may be divided into Nodes B5 and B6 using a numerical signature based at least in part on a dimensional ratio which may be defined according to the following equation:

$$d_{16} = \frac{BCH}{W},$$

wherein $d_{16}$ may be the dimensional ratio, BCH may be the length of a segment between two intersection points of the boundary of the image object and horizontal scanning line 702 taken at about 10% down from the top height of the image object, and W may be the width of the image object. Image objects with $d_{16}$ greater than or equal to about 0.42 may be categorized under Node B5 (including image objects for the letters G and H). Image objects with $d_{16}$ less than about 0.42 may be categorized under Node B6 (including the image object for letter P).

As also illustrated in FIG. 10*j*; image objects for hand gestures categorized under Node B5 may be further divided into Nodes B7 and B8 using a numerical signature based at least in part on a dimensional ratio which may be defined according to the following equation:

$$d_{17} = \frac{BCV}{H},$$

wherein $d_{17}$ may be the dimensional ratio, BCV may be the maximum value of length of a segment between two intersection points of the boundary of the image object and vertical scanning line 802 taken at about 7% and about 14% along the width of the image object, and H may be the height of the image object. Image objects for with $d_{17}$ less than about 0.26 may be categorized under Node B7 (including the image object for the letter G). Image objects with $d_{17}$ greater than or equal to about 0.26 may be categorized under Node B8 (including the image object for the letter H).

Therefore, by comparing the different numerical signatures and conditions, based at least in part on dimensional ratios and the number of intersection points along scanning lines at different nodes, an image object may be identified, as certain image objects for hand gestures belonging to a certain cluster of a reference database can be pre-eliminated. In one illustrative example, an image object with dimensional ratios $d_1$ greater than 0.94 may be identified as image objects for hand gestures for either alphabets Q, G, H, Y and P under Node B in FIG. 10*a*. Subsequently, by comparing whether $d_1$ is within the range of greater than 0.94 and lesser or equal to 1.6; the image object may be further identified as either letter Q or Y under Node B1 in FIG. 10*b*. Finally, if the dimensional ratio $d_{15}$ of the image object is greater than or equal to 0.12; the image object may be identified as the hand gesture of letter Q under Node B3 in FIG. 10*i*. Similarly, each of the static letters may be identified through a hierarchical analysis.

Based at least in part on such a hierarchical structure, the gestures of static ASL may be identified. Other gestures for other systems of language may be similarly organized into hierarchical structures to facilitate the identification of the hand gestures.

Figure 11:
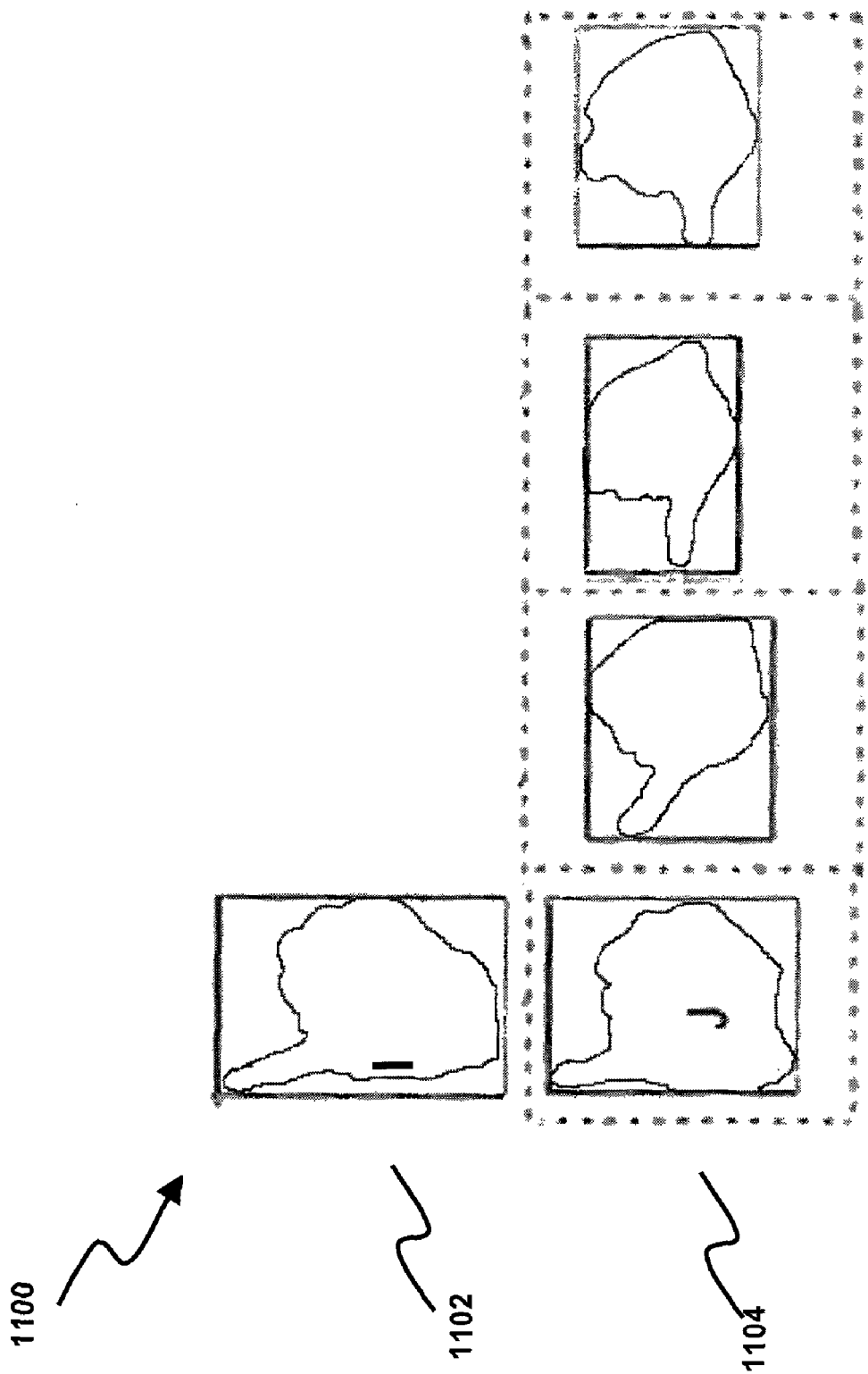
FIG. 11 illustrates a boundary of an example image object of the static hand gesture of letter I and boundaries of example image objects of the dynamic hand gesture of letter J.
Figure 12:
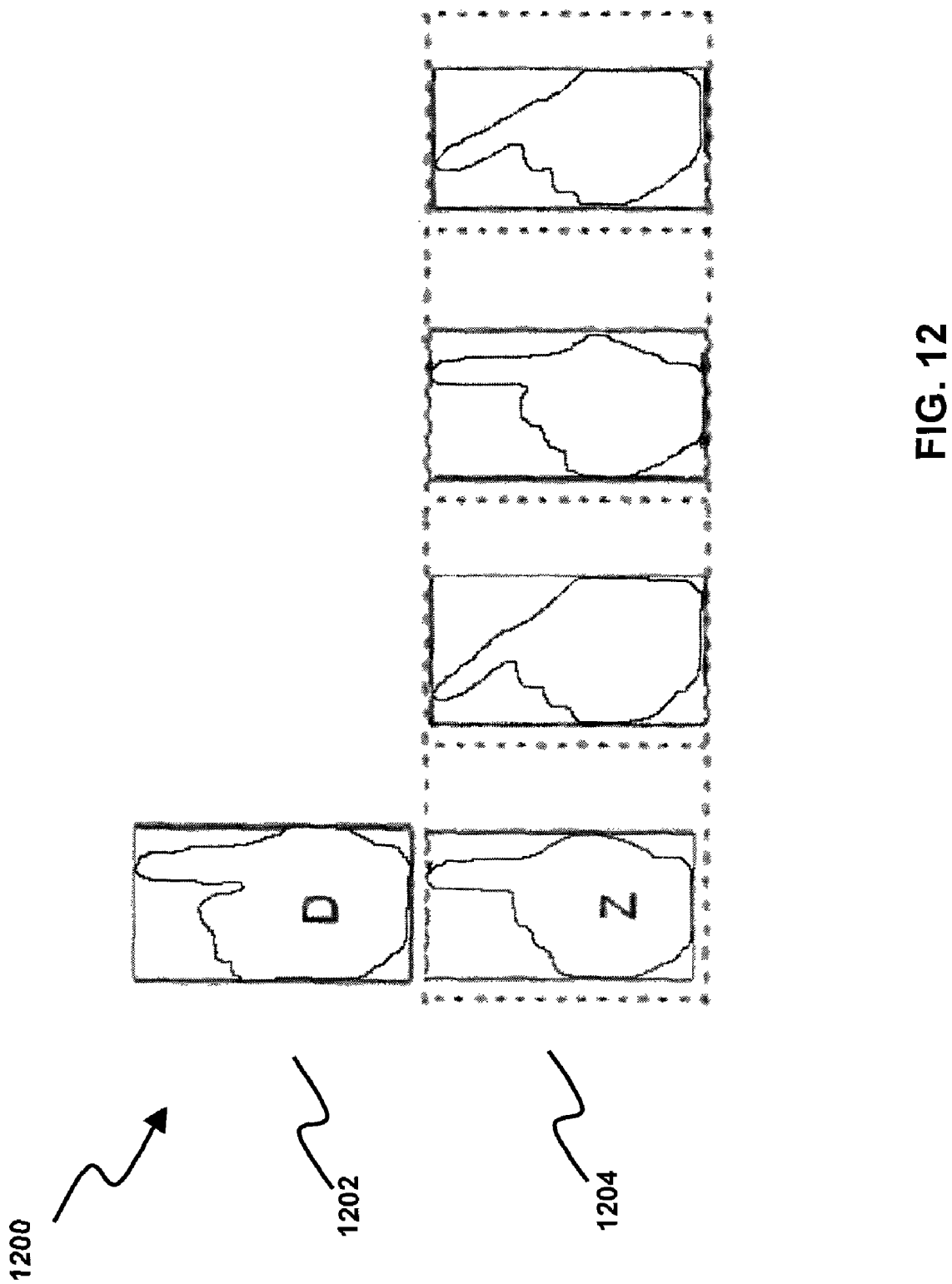
FIG. 12 illustrates a boundary of an example image object of the static hand gesture of letter D and boundaries of example image objects of the dynamic hand gesture of letter Z.

Besides static hand gestures, ASL 100 may also include two dynamic hand gestures for letters J and Z. As dynamic hand gestures may be hand gestures with motions, a concatenated image set may be captured for the recognition process. As illustrated in FIG. 11, the letter I 1102 and the first form letter J 1104 may be the same. The letter D 1202 and the first form of letter Z 1204 may also be the same, as is illustrated in FIG. 12.

Figure 13:
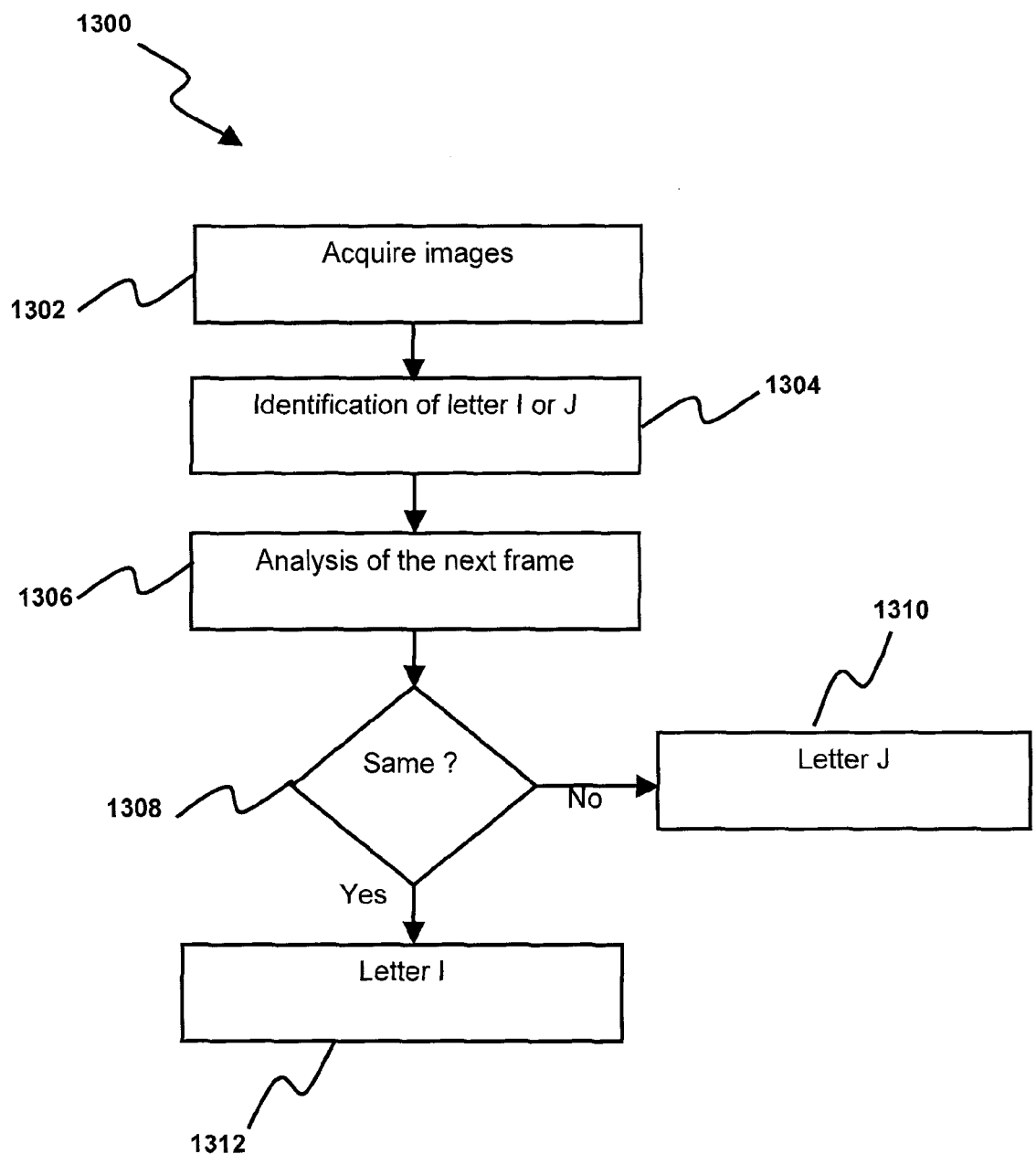
FIG. 13 illustrates a flow diagram of a dynamic hand gesture recognition method in accordance with one embodiment of the present invention.

FIG. 13 illustrates a flow diagram of a dynamic hand gesture recognition method 1300 in accordance with one embodiment. Two (or more) images may be captured at block 1302. When the first image object is recognized as either letter I or J at block 1304, as according to the above described methods, a second image object may be analyzed at block 1306. If the second image object is substantially similar to, or the same as, the first image object at block 1308, the image object may be recognized as letter I at block 1312. If the second image object is not substantially similar to, or is different from, the first image, the image object may be recognized as letter J at block 1310. A similar flow diagram may be applicable for differentiating between the letter Z 1104 and letter D 1102.

In some embodiments, the above described techniques may be implemented as sequences of instructions executed by an electronic system or machine. The sequences of instructions may be stored by the electronic device or the instructions can be received by the electronic device (e.g., via a network connection).

Figure 14:
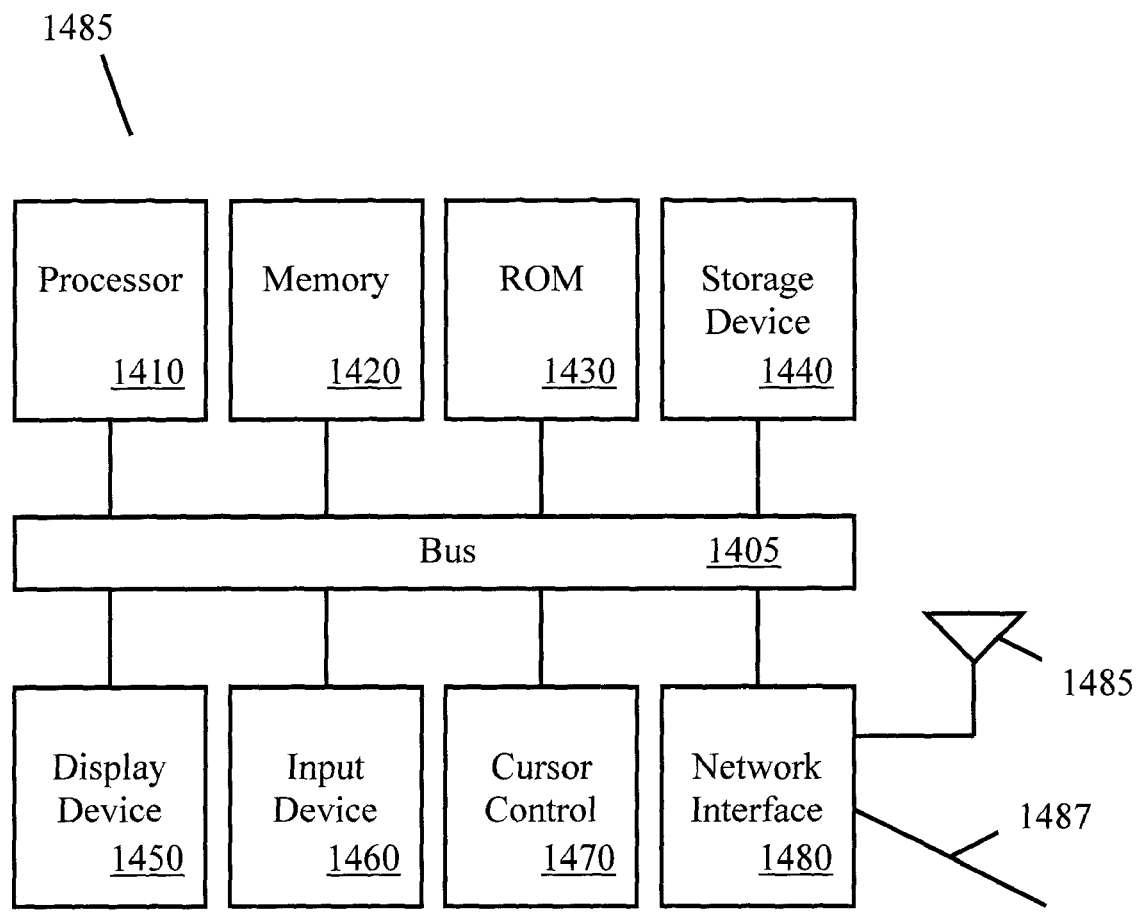
FIG. 14 illustrates a block diagram of an electronic system in accordance with one embodiment of the present invention.

FIG. 14 is a block diagram of an electronic system according to one embodiment. The electronic system illustrated in FIG. 14 is intended to represent a range of electronic systems, for example, computer systems, network access devices, etc. Alternative systems, whether electronic or non-electronic, can include more, fewer, or different components. Certain embodiments may include additional components, may not require all of the illustrated components, or may combine one or more of the illustrated components. For example, the described memory may be on chip with the described processor.

Electronic system 1400 may include a bus 1405 or other communication device to communicate information, and processor 1410 coupled to bus 1405 to process information. Bus 1405 may include a bus bridge, an I/O (Input/Output) Bus, and/or a high speed bus. While electronic system 1400 is illustrated with a single processor, electronic system 1400 may include multiple processors or co-processors. Electronic system 1400 may further include random access memory (RAM) or other dynamic storage device 1420 (referred to as memory), coupled to bus 1405 to store information and instructions to be executed by processor 1410. Memory 1420 also can be used to store temporary variables or other intermediate information during execution of instructions by processor 1410.

Electronic system 1400 may also include read only memory (ROM) and/or other static storage device 1430 coupled to bus 1405 to store static information and instructions for processor 1410. Further, data storage device 1440 may be coupled to bus 1405 to store information and instructions. Data storage device 1440 such as a magnetic disk or optical disc and corresponding drive can be coupled to electronic system 1400.

Electronic system 1400 may also have coupled to bus 1405 a display device 1450, such as a cathode ray tube (CRT) or liquid crystal display (LCD), to display information to a user. Input device 1460, including alphanumeric and other keys, may be typically coupled to bus 1405 to communicate information and command selections to processor 1410. Another type of user input device may be cursor control 1470, such as a mouse, a trackball, or cursor direction keys to communicate direction information and command selections to processor 1410 and to control cursor movement on display 1450. Electronic system 1400 may further include a network interface 1480, such as, but not limited to, a wired network interface 1487 or a wireless network interface 1485 to provide access to a network, such as a local area network.

Instructions may be provided to memory or the processor by any machine readable medium. An electronically-accessible or machine readable medium includes any mechanism that provides (i.e., stores and/or transmits) content (e.g., computer executable instructions) in a form that may be readable by an electronic device (e.g., a computer, a server, a personal digital assistant, a cellular telephone). In various examples, the machine readable instructions may be provided in a machine readable medium such as from a storage device (such as magnetic disk or optical storage media), a read-only memory (ROM), random access memory (RAM), Flash memory, CD-ROM, DVD, via a remote connection (e.g., over a wired or wireless network via network interface such as by a propagated signal: carrier waves, infrared signals, digital signals, etc.) providing access to one or more electronically-accessible media, etc. In alternative embodiments, hard-wired circuitry or firmware can be used in place of or in combination with software instructions. For example, one or more application specific integrated circuits (ASICs) may be programmed with one or more of the described functions. In another example, one or more programmable grid arrays (PGAs) may be used to implement one or more of the functions of the described subject matter. Thus, execution of sequences of instructions is not limited to any specific combination of hardware circuitry and software instructions.

While there has been illustrated and/or described what are presently considered to be example embodiments of claimed subject matter, it will be understood by those skilled in the art that various other modifications may be made, and/or equivalents may be substituted, without departing from the true scope of claimed subject matter. Additionally, many modifications may be made to adapt a particular situation to the teachings of claimed subject matter without departing from subject matter that is claimed. Therefore, it is intended that the patent not be limited to the particular embodiments disclosed, but that it covers all embodiments falling within the scope of the appended claims.

What is claimed is:

1. A method for a computer system to recognize a hand gesture comprising:
    obtaining a captured image at an image capture device, wherein the captured image includes an image object, the image object being an image of a hand, and saving the captured image as a file on the computer system;
    generating a numerical signature at the computer system based on the image object, wherein the numerical signature includes a dimensional ratio of a length of a segment, the length of the segment created by an intersection between a boundary of the image object and a vertical scanning line, and a height of the image object;
    providing a plurality of reference numerical signatures at the computer system, the plurality of reference numerical signatures having a plurality of reference hand gestures associated therewith; and
    identifying one of the plurality of reference numerical signatures as being descriptive of the numerical signature, wherein a hand gesture corresponding to the one of the plurality of reference numerical signatures is attributable to the image of the hand; and
    producing a visual or audio output based on the hand gesture attributed to the image of the hand.

2. The method of claim 1, wherein the numerical signature comprises a second dimensional ratio of the image object, the second dimensional ratio being calculated as:

$$d = \frac{W}{H},$$

wherein d is the second dimensional ratio, W is a width of the image object, and H is the height of the image object.

3. The method of claim 1, wherein the vertical scanning line is scanned at 34% of the width of the image object.

4. The method of claim 1, wherein the numerical signature comprises a number of intersections between a boundary of the image object and a horizontal scanning line.

5. The method of claim 1, wherein the hand gesture comprises one of the American Sign Language (ASL) gestures.

6. The method of claim 1, further comprising:
    arranging the plurality of reference hand gestures in a hierarchical structure at the computer system, wherein the hierarchical structure is arranged according to the plurality of reference numerical signatures corresponding thereto, and wherein the hierarchical structure enables searching of the plurality of reference hand gestures.

7. The method of claim 1, further comprising:
    obtaining a second captured image at the image capture device, wherein the second captured image includes a second image object, the second image object being a second image of the hand, and saving the second captured image as a second file on the computer system;
    determining whether the second captured image is substantially similar to the captured image at the computer system; and
    if the second captured image and the captured image are not substantially similar, attributing a second hand gesture to the captured image and the second captured image at the computer system.

8. A machine readable non-transitory medium having stored therein a plurality of instructions that, when executed, cause the machine to identify a hand gesture by:
    receiving a captured image including an image object, the image object being an image of a hand;
    generating a numerical signature based on the image object, wherein the numerical signature includes a dimensional ratio of a length of a segment, the length of the segment created by an intersection between a boundary of the image object and a vertical scanning line, and a height of the image object;
    receiving a plurality of reference numerical signatures, the plurality of reference numerical signatures having a plurality of reference hand gestures associated therewith; and
    identifying one of the plurality of reference numerical signatures being descriptive of the numerical signature, wherein a hand gesture corresponding to the one of the plurality of reference numerical signatures is attributable to the image of the hand.

9. The machine readable non-transitory medium of claim 8, wherein the numerical signature comprises a second dimensional ratio of the image object, the second dimensional ratio being calculated as:

$$d = \frac{W}{H},$$

wherein d is the dimensional ratio, W is a width of the image object, and H is the height of the image object.

10. The machine readable non-transitory medium of claim 8, wherein the vertical scanning line is scanned at 34% of the width of the image object.

11. The machine readable non-transitory medium of claim 8, wherein the numerical signature comprises a number of intersections between a boundary of the image object and a horizontal scanning line.

12. The machine readable non-transitory medium of claim 8, wherein the hand gesture comprises one of the American Sign Language (ASL) gestures.

13. The machine readable non-transitory medium of claim 8, further comprising instructions that, when executed, cause the machine to identify a hand gesture by:
arranging the plurality of reference hand gestures in a hierarchical structure according to the plurality of reference numerical signatures corresponding thereto, wherein the hierarchical structure enables searching of the plurality of reference hand gestures.

14. The machine readable non-transitory medium of claim 8, further comprising instructions that, when executed, cause the machine to identify a hand gesture by:
obtaining a second captured image including a second image object, the second image object being a second image of the hand;
determining whether the second captured image is substantially similar to the captured image; and
if the second captured image and the captured image are not substantially similar, attributing a second hand gesture to the captured image and the second captured image.

15. An apparatus comprising:
a machine readable medium having stored therein a plurality of instructions that, when executed, cause the apparatus to identify a hand gesture by:
receiving a captured image including an image object, the image object being an image of a hand;
generating a numerical signature based on the image object, wherein the numerical signature includes a dimensional ratio of a length of a segment, the length of the segment created by an intersection between a boundary of the image object and a vertical scanning line, and a height of the image object;
receiving a plurality of reference numerical signatures, the plurality of reference numerical signatures having a plurality of reference hand gestures associated therewith; and
identifying one of the plurality of reference numerical signatures being descriptive of the numerical signature, wherein a hand gesture corresponding to the one of the plurality of reference numerical signatures is attributable to the image of the hand; and
a processor coupled to the machine readable medium to execute the programming instructions.

16. The apparatus of claim 15, wherein the numerical signature comprises a second dimensional ratio of the image object, the second dimensional ratio being calculated as:

$$d_1 = \frac{W}{H},$$

wherein d is the dimensional ratio, W is a width of the image object, and H is the height of the image object.

17. The apparatus of claim 15, wherein the vertical scanning line is scanned at 34% of the width of the image object.

18. The apparatus of claim 15, wherein the numerical signature comprises a number of intersections between a boundary of the image object and a horizontal scanning line.

19. The apparatus of claim 15, wherein the hand gesture comprises one of American Sign Language (ASL) gestures.

20. The apparatus of claim 15, wherein the machine readable medium further comprises instructions that, when executed, cause the apparatus to identify a hand gesture by:
arranging the plurality of reference hand gestures in a hierarchical structure according to the plurality of reference numerical signatures corresponding thereto, wherein the hierarchical structure enables searching of the plurality of reference hand gestures.

21. The apparatus of claim 15, wherein the machine readable medium further comprises instructions that, when executed, cause the apparatus to identify a hand gesture by:
obtaining a second captured image including a second image object, the second image object being a second image of the hand;
determining whether the second captured image is substantially similar to the captured image; and
if the second captured image and the captured image are not substantially similar, attributing a second hand gesture to the captured image and the second captured image.

* * * * *